(12) United States Patent
Gillis et al.

(10) Patent No.: US 8,714,613 B1
(45) Date of Patent: May 6, 2014

(54) CENTER CONSOLE AND TRAY ASSEMBLY

(71) Applicant: Ford Global Technologies, LLC, Dearborn, MI (US)

(72) Inventors: Francis Raymond Gillis, Farmington Hills, MI (US); Jolanta Coffey, Canton, MI (US); Alan Perelli, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/742,892

(22) Filed: Jan. 16, 2013

(51) Int. Cl.
*B60R 13/00* (2006.01)
*B60R 7/04* (2006.01)

(52) U.S. Cl.
CPC .................................. *B60R 7/04* (2013.01)
USPC ........................................................ 296/24.34

(58) Field of Classification Search
CPC .... G11B 17/0283; B67D 1/16; H05K 7/1412; H05K 7/20581; Y10S 224/926; B01D 3/20; B01D 3/22; B01D 3/009; B01J 2208/000247; B01J 2208/000548
USPC ..................... 296/24.34, 37.8, 37.5; 271/162; 400/693; 261/114.1
See application file for complete search history.

(56) References Cited

U.S. PATENT DOCUMENTS

| | | | |
|---|---|---|---|
| 3,136,461 A * | 6/1964 | Gregg, Jr. ...................... 224/540 |
| 5,338,081 A * | 8/1994 | Young et al. ................ 296/37.14 |
| 5,397,160 A * | 3/1995 | Landry .......................... 296/37.8 |
| 5,542,589 A * | 8/1996 | McKee ........................... 224/275 |
| 5,599,054 A * | 2/1997 | Butz et al. ..................... 296/37.8 |
| 6,045,173 A * | 4/2000 | Tiesler et al. ................. 296/37.8 |
| 6,497,441 B1 * | 12/2002 | Mahmood et al. ......... 296/24.34 |
| 6,682,116 B1 * | 1/2004 | Okumura ...................... 296/37.8 |
| 6,719,343 B2 * | 4/2004 | Emerling et al. ............ 296/24.34 |
| 6,851,736 B1 * | 2/2005 | Klopp et al. .................. 296/37.8 |
| 6,890,012 B2 * | 5/2005 | Maierholzner ............ 296/24.34 |
| 7,029,048 B1 * | 4/2006 | Hicks et al. ................. 296/24.34 |
| 7,104,580 B2 * | 9/2006 | Clark et al. ................. 296/24.32 |
| 7,168,750 B2 * | 1/2007 | Hutek et al. ................... 296/37.8 |
| 7,278,681 B2 * | 10/2007 | Lilov et al. ................ 297/188.17 |
| 7,513,007 B2 * | 4/2009 | Chernoff ......................... 15/313 |
| 7,513,553 B2 * | 4/2009 | Singh et al. ................... 296/37.8 |
| 7,581,774 B2 | 9/2009 | Abro et al. |
| 7,591,498 B2 * | 9/2009 | Busha et al. ................ 296/24.34 |
| 7,770,953 B2 * | 8/2010 | Koarai ....................... 296/24.34 |
| 7,810,969 B2 * | 10/2010 | Blackmore et al. ........... 362/459 |
| 8,196,985 B2 * | 6/2012 | Penner et al. ............... 296/24.34 |
| 8,540,297 B2 * | 9/2013 | Browne et al. ............. 296/24.34 |
| 8,616,605 B2 * | 12/2013 | Hipshier et al. ............ 296/24.34 |
| 2006/0261621 A1 * | 11/2006 | Sturt et al. .................... 296/37.8 |
| 2007/0046058 A1 * | 3/2007 | Busha et al. ................... 296/37.8 |
| 2007/0114818 A1 * | 5/2007 | Reitzloff et al. ............... 296/219 |
| 2008/0079279 A1 * | 4/2008 | Spykerman et al. ........ 296/24.34 |
| 2010/0090491 A1 | 4/2010 | Hipshier et al. |

* cited by examiner

*Primary Examiner* — Kiran B Patel
(74) *Attorney, Agent, or Firm* — Vichit Chea; Price Heneveld LLP

(57) ABSTRACT

A console assembly includes a console housing with first and second compartments. Each compartment includes one or more track members disposed on an interior portion of each compartment. A tray assembly includes engagement tabs which are adapted to couple to the track members of the first compartment in a first configuration, and further adapted to couple to the track members of the second compartment in a second configuration. Thus, the tray assembly is removable and can be positioned in either the first compartment or the second compartment. The tray assembly is adapted to move between fore and aft positions along the track members, and the tray assembly is also operable between forward and rearward tilt positions in either compartment in assembly.

8 Claims, 27 Drawing Sheets

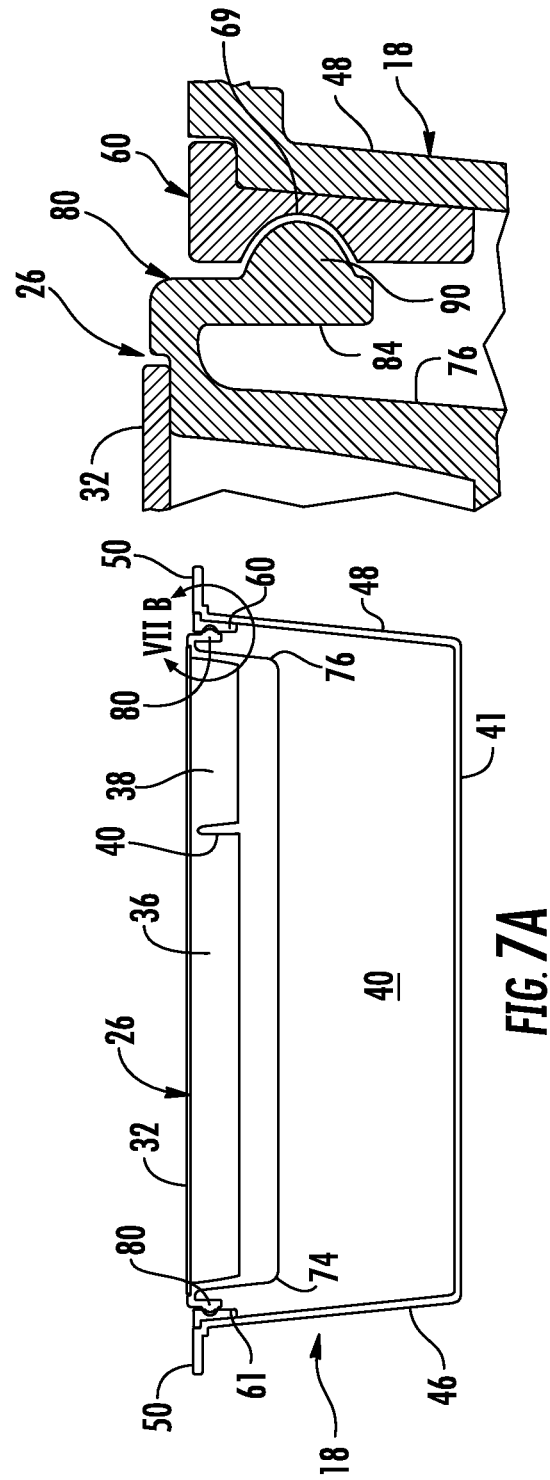

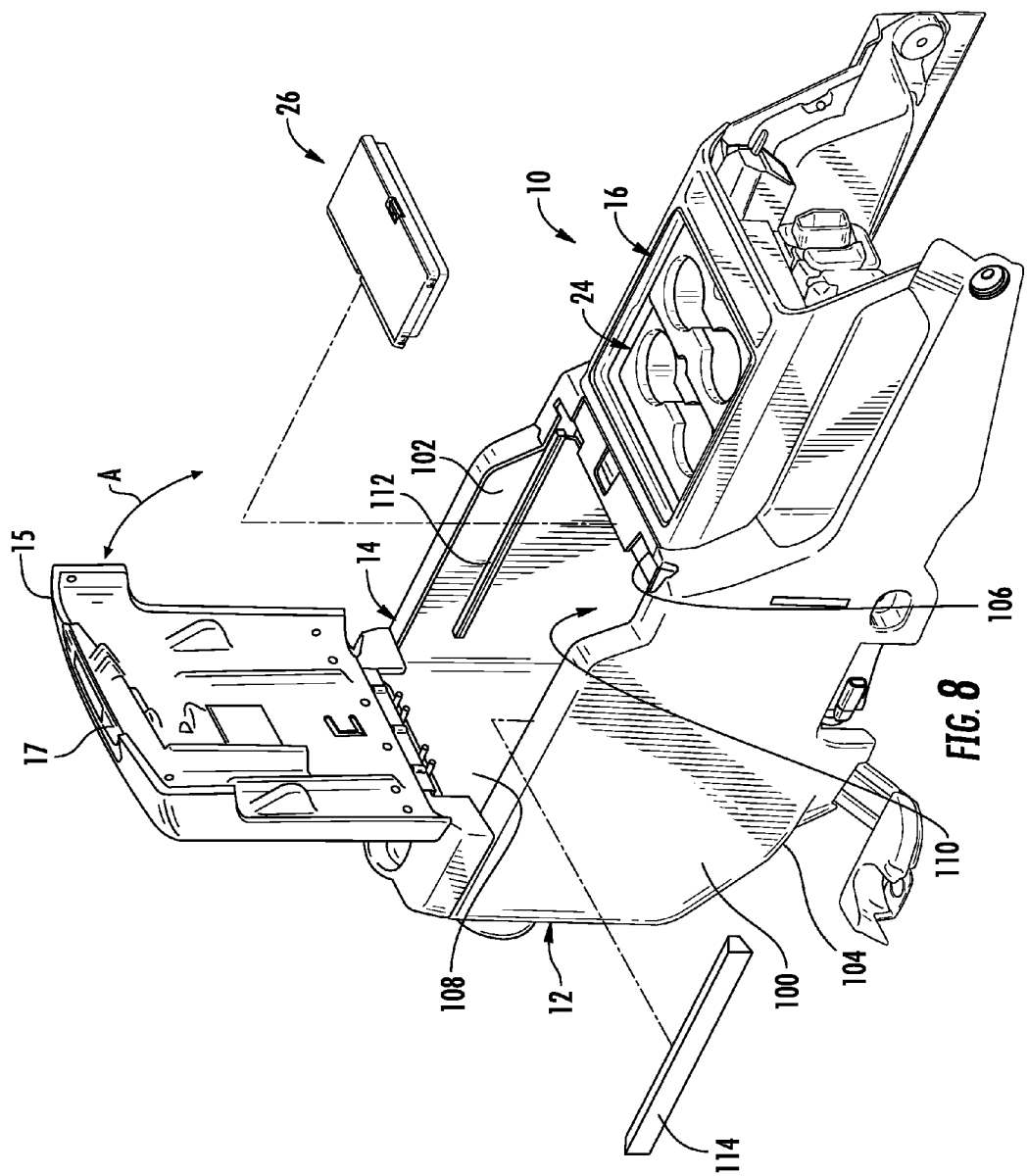

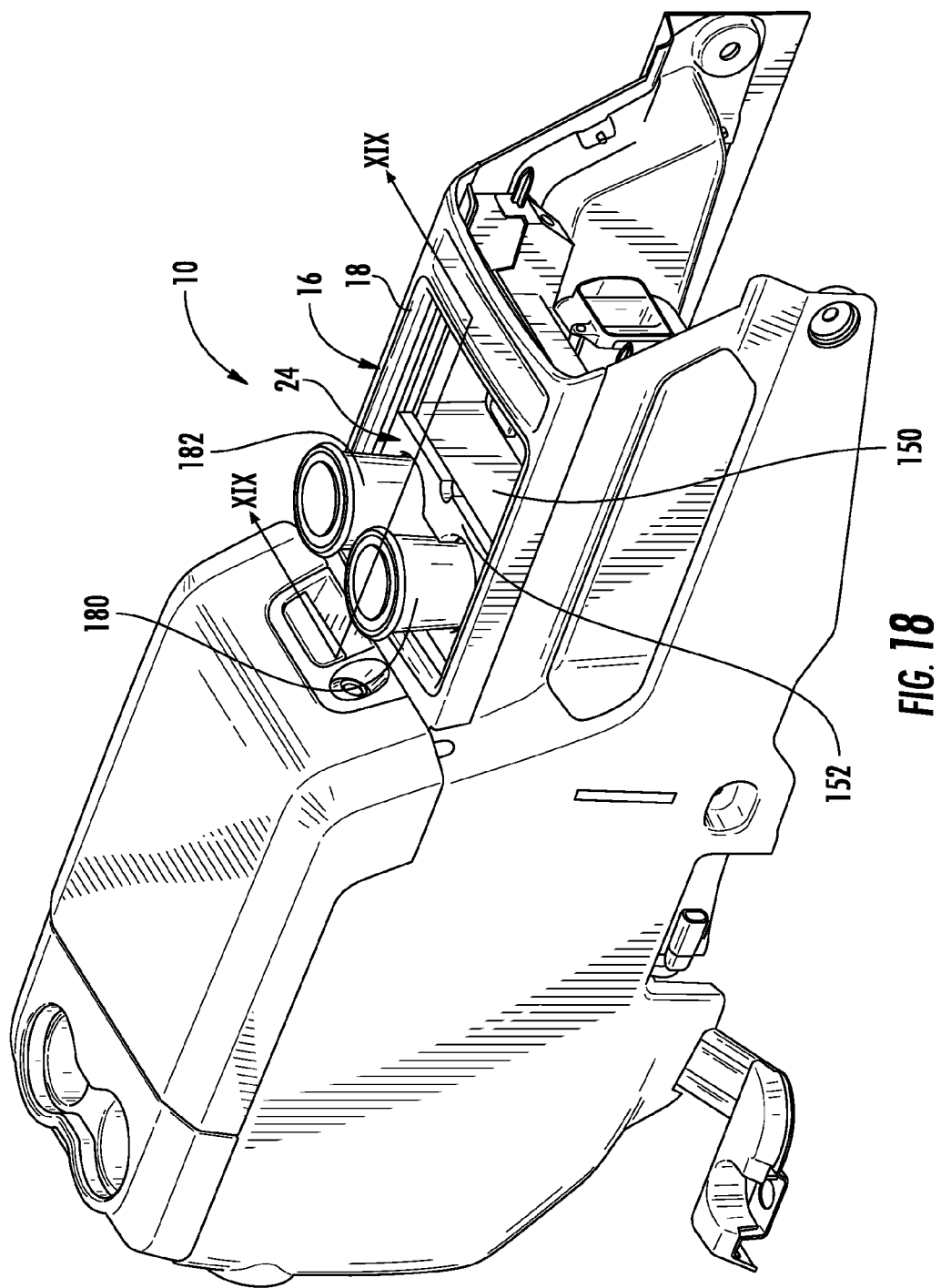

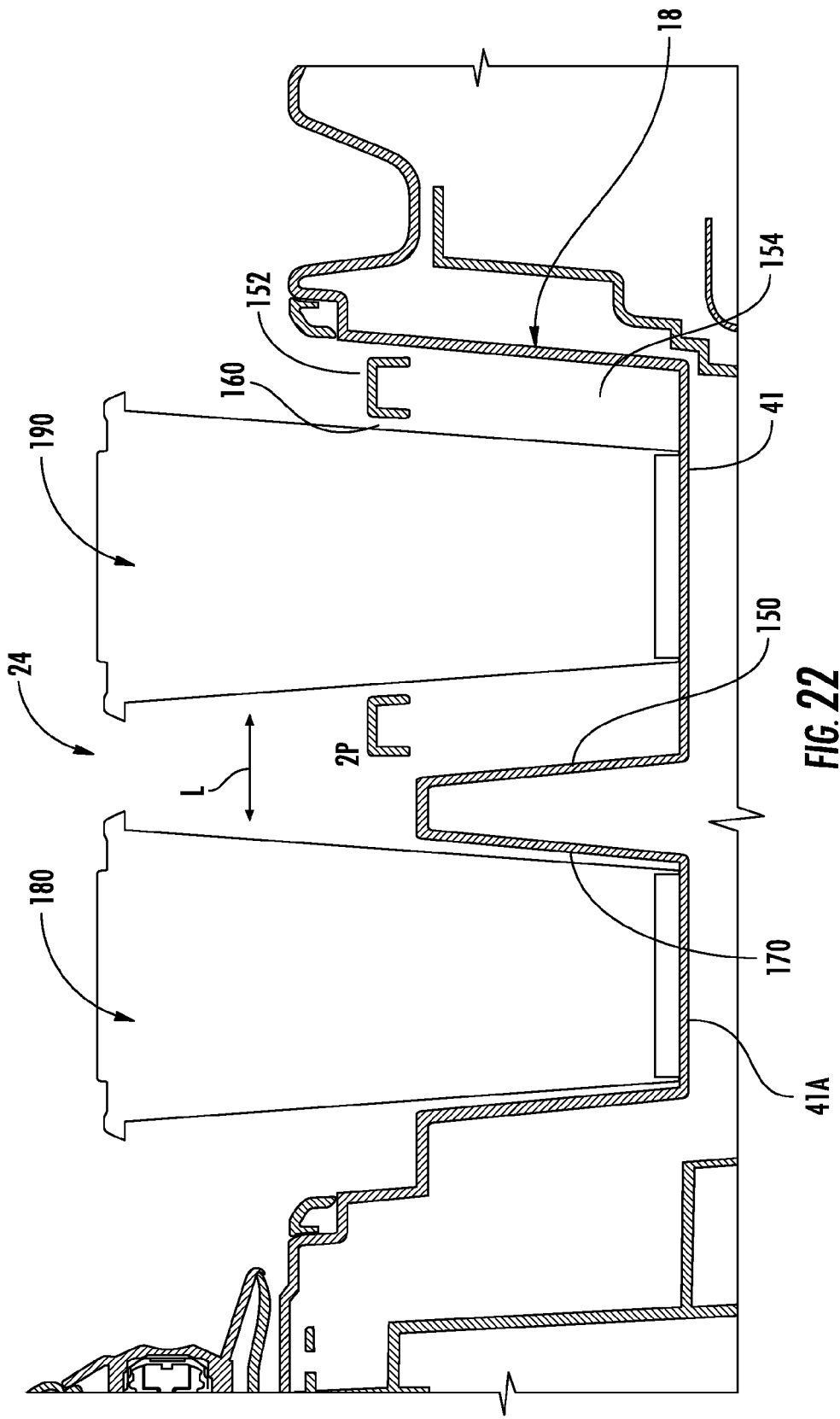

CENTER CONSOLE AND TRAY ASSEMBLY

FIELD OF THE INVENTION

The present invention generally relates to a console assembly for use within a vehicle interior, and more particularly, to a console assembly having upper and lower console compartments, wherein each compartment includes track members adapted to receive a removable storage tray, wherein the storage tray is moveable between fore and aft positions, as well as forward and rearward tilt positions, thereby providing multiple configurations for a user to access the console compartments.

BACKGROUND OF THE INVENTION

As automotive interior styling progresses, there has been an increased desire for unique and stylish solutions for console assemblies to maximize storage capabilities as well as provide customizable storage features. For example, many console compartments may include a storage bin having a trinket tray assembly disposed therein. These tray assemblies often do not slide or pivot within the storage compartment. Thus, such tray assemblies can get in the way when a user tries to access the contents of a storage bin disposed below the tray assembly. If the tray assembly is removable, the user may have to remove the trinket tray in order to access the storage compartment. When removing the tray, contents can easily fall out as many removable trays do not include a lid.

The present invention provides a storage tray assembly that can slide between fore and aft positions to better provide access to a storage bin disposed below the tray. The tray assembly can also tilt in forward and rearward directions to allow larger objects to be put into the storage bin without having to remove the tray. Further, the present invention includes a lid on the tray assembly, such that tray contents will remain within the tray if the tray is removed.

SUMMARY OF THE INVENTION

One aspect of the present invention includes a console assembly having a console housing with first and second compartments. Each compartment includes one or more track members disposed on an interior portion of each compartment. A tray assembly includes engagement tabs which are adapted to couple to the track members of the first compartment in a first configuration, and further adapted to couple to the track members of the second compartment in a second configuration. Thus, the tray assembly is removable and can be positioned in either the first compartment or the second compartment. The tray assembly is adapted to move between fore and aft positions along the track members when disposed in either the first or second compartment, and the tray assembly is also operable between forward and rearward tilt positions in assembly.

Another aspect of the present invention includes a console assembly having a tray assembly and at least one storage compartment. The storage compartment includes first and second side walls, wherein each side wall has a detent track on which the tray assembly is slidably supported between fore and aft positions. Front and rear detent pockets are disposed at opposite ends of each detent track. The front and rear detent pockets are adapted to pivotally support the tray assembly between forward and rearward tilt positions in assembly.

Yet another aspect of the present invention includes a console assembly having a storage compartment with first and second side walls. Track members are disposed on the first and second side walls on upper interior portions thereof. A tray assembly is slidably received on the track members and is operable between fore and aft positions along the track members. The tray assembly is adapted to pivotally move to a forward tilt position from the fore position, and is further adapted to pivotally move to a rearward tilt position from the aft position in assembly.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7A is a side elevational view of a storage tray assembly and a lower compartment assembly;

FIG. 7B is a fragmentary side elevational view of the storage tray assembly and lower bin compartment of FIG. 7A taken at location VIIB;

FIG. 8 is a perspective view of the console assembly of FIG. 1 having an upper compartment lid in an open position and a storage tray assembly shown being inserted into the upper compartment;

FIG. 18 is a perspective view of the console assembly of FIG. 17 having two beverage containers disposed in the container holder assembly;

FIG. 22 is a fragmentary cross-sectional view of the console assembly of FIG. 21 taken along line XXII.

DETAILED DESCRIPTION OF THE PREFERRED EMBODIMENTS

Figure 1:
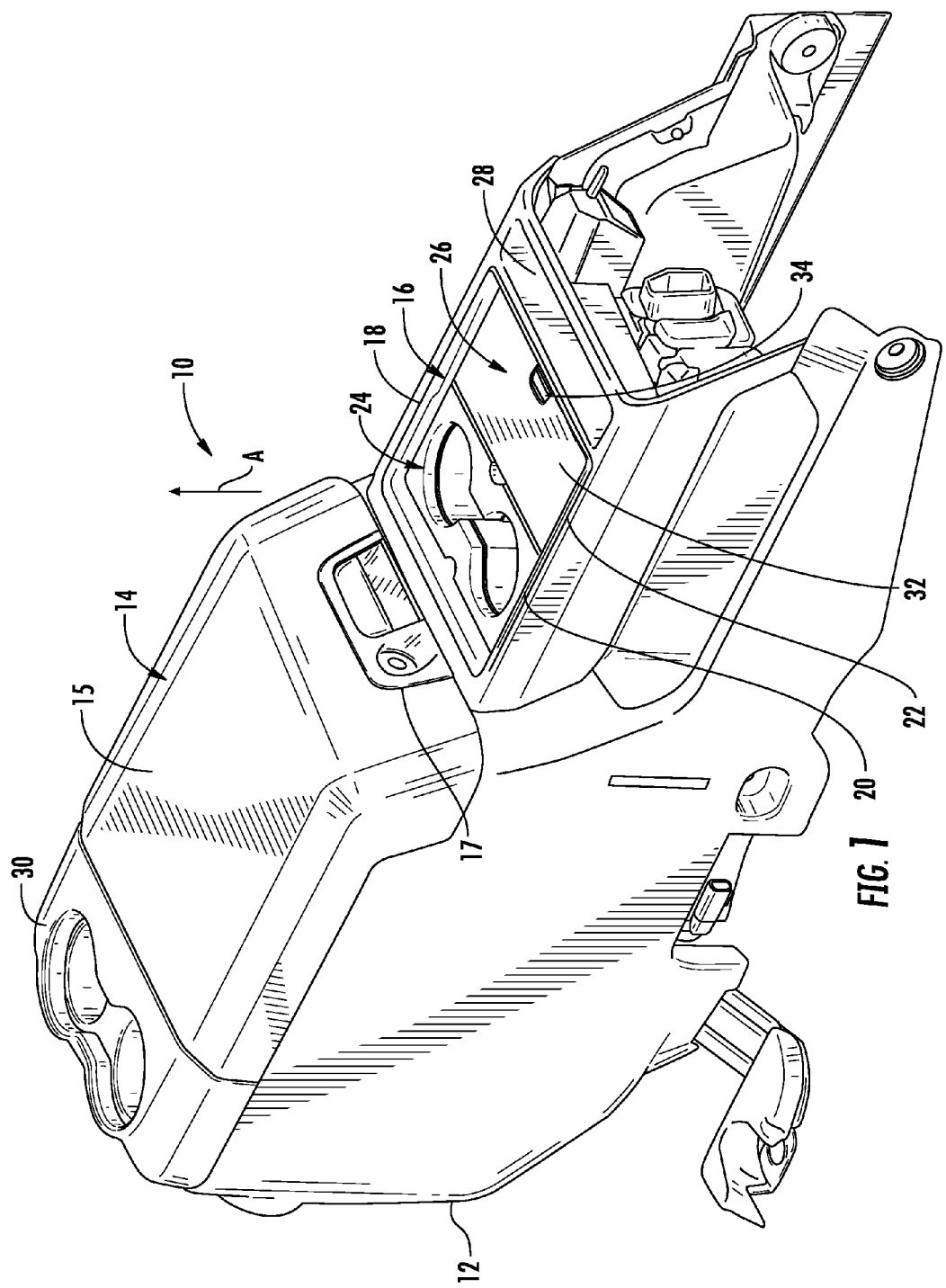
FIG. 1 is a perspective view of a console assembly according to an embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, reference numeral 10 generally designates a console assembly having an outer casing or housing 12. As shown in FIG. 1, the console assembly 10 is in the form of a center console assembly which is configured to be disposed within a vehicle interior, generally between the driver and passenger seats. The console assembly 10 includes an upper console compartment 14 having a cover 15 which is shown in FIG. 1 in a closed position. The cover 15 can be pivoted on the console housing 12 in a direction as indicated by arrow A to open the upper compartment 14, thereby providing access thereto, and further includes a latch mechanism 17 for retaining the cover 15 in the closed position. The console assembly 10 further includes a lower console compartment 16 having a housing or bin compartment 18 which includes a first portion 20 and a second portion 22. As shown in FIG. 1, a container or cup holder apparatus 24 is disposed within the first portion 20 of the housing 18, and a storage tray 26 is disposed in the second portion 22 of the housing 18. As shown in FIG. 1, and further exemplified in FIG. 5A, the housing 18 of the lower compartment 16 is in the form of a storage compartment or bin adapted to store various items therein. The storage tray assembly 26 further includes a lid 32, which is shown in FIG. 1 in a closed position. The lid 32 further includes a latch assembly 34 which is adapted to retain the lid 32 in the closed position until released by the user. An elongate trinket tray 28 is disposed in a car forward position relative to the lower compartment 16. A second cup holder assembly 30 is disposed in the car rearward position relative to the upper console compartment 14. The cup holder assembly 30 is disposed at a rearmost location on the console assembly 10, such that the cup holder assembly 30 is generally accessible from the rear seat of the vehicle for use by rear seat passengers.

Figure 2:
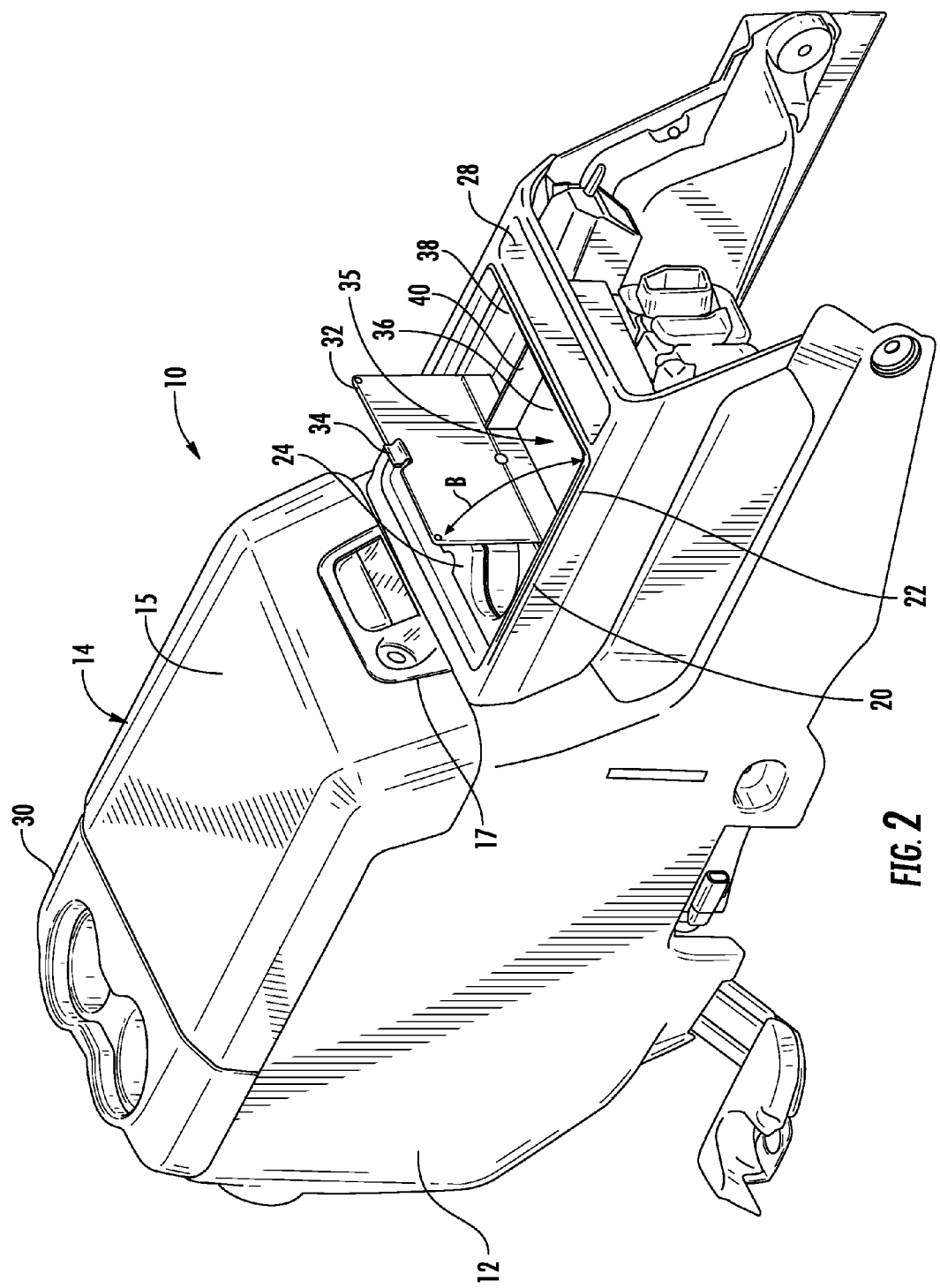
FIG. 2 is a perspective view of the console assembly of FIG. 1 having a lid to a storage tray assembly in an open position.

Referring now to FIG. 2, the storage tray assembly 26 is shown having the lid portion or storage compartment cover 32 in an open position. The lid 32 is pivotable between the open position and the closed position in a path as indicated by arrow B. In the embodiment shown in FIG. 2, the storage tray assembly 26 includes a storage compartment 35 having first and second storage areas 36, 38, which are shown in FIG. 2 as being separated by a divider 40. It is contemplated that the storage compartment 35 is a molded one-piece polymeric storage compartment, wherein the divider 40 separates the storage compartment 35 into the first storage area 36, which is adapted to store larger items such as MP3 players and mobile devices, and the second storage area 38, which is a smaller storage compartment adapted to store loose change and other like items. Thus, the storage tray assembly 26 is configured to store items which a user would like to have readily accessible, rather than having to sort through the larger storage bin 18 to find and retrieve such items.

Figure 3:
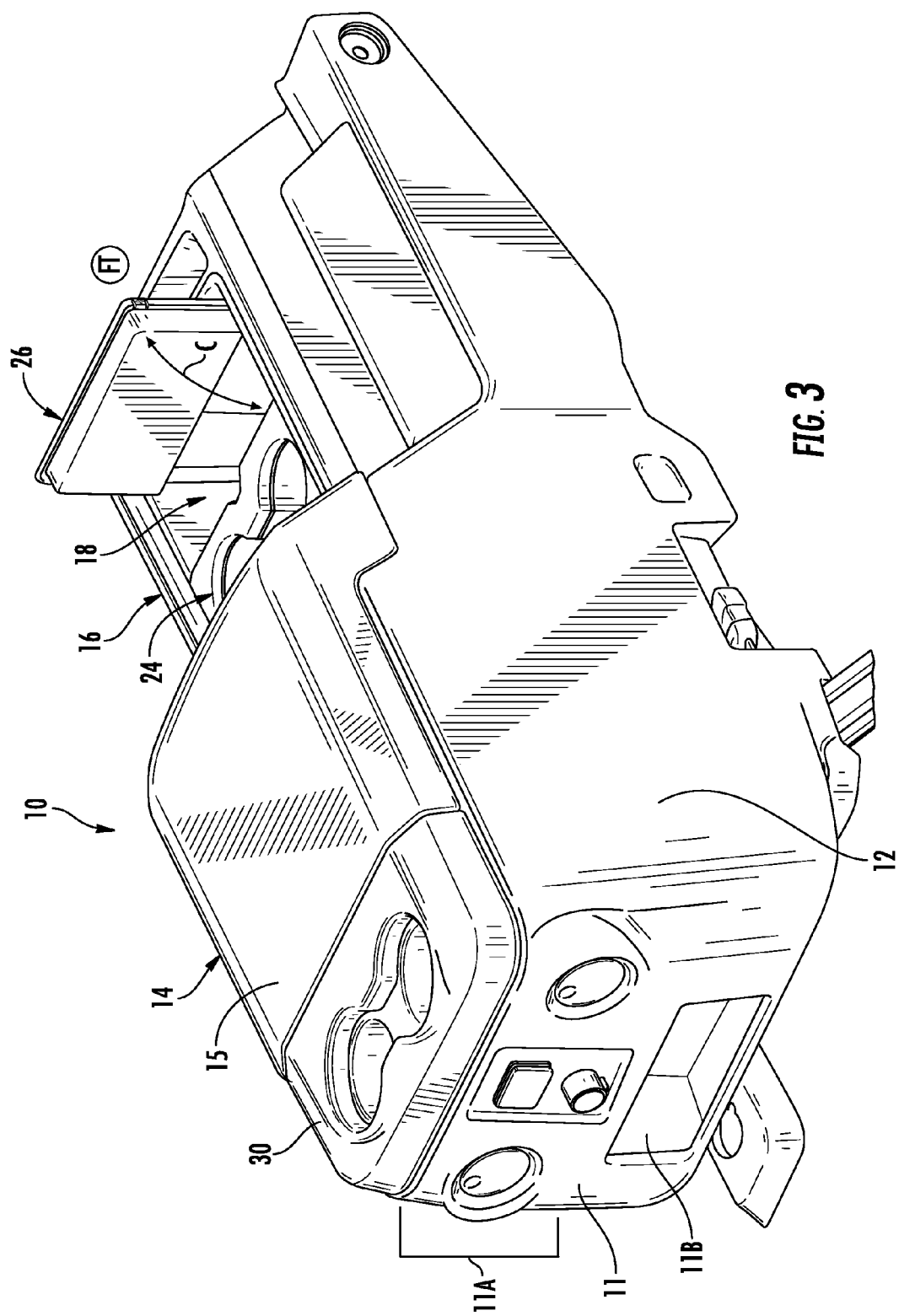
FIG. 3 is a rear perspective view of the console assembly of FIG. 1 having the tray assembly in a forward tilt position.

Referring now to FIG. 3, the storage tray assembly 26 is shown in a forward tilt position FT, thereby providing greater access to the housing or storage bin 18 in which the storage tray assembly 26 is disposed. The storage tray assembly 26 can be tilted to the forward tilt position FT from an at rest position in a direction as indicated by arrow C. As further shown in FIG. 3, the console assembly 10 includes a rear panel 11 having air conditioning controls 11A and a storage compartment 11B disposed thereon, which are generally accessible to rear seat passengers within a vehicle interior.

Figure 4:
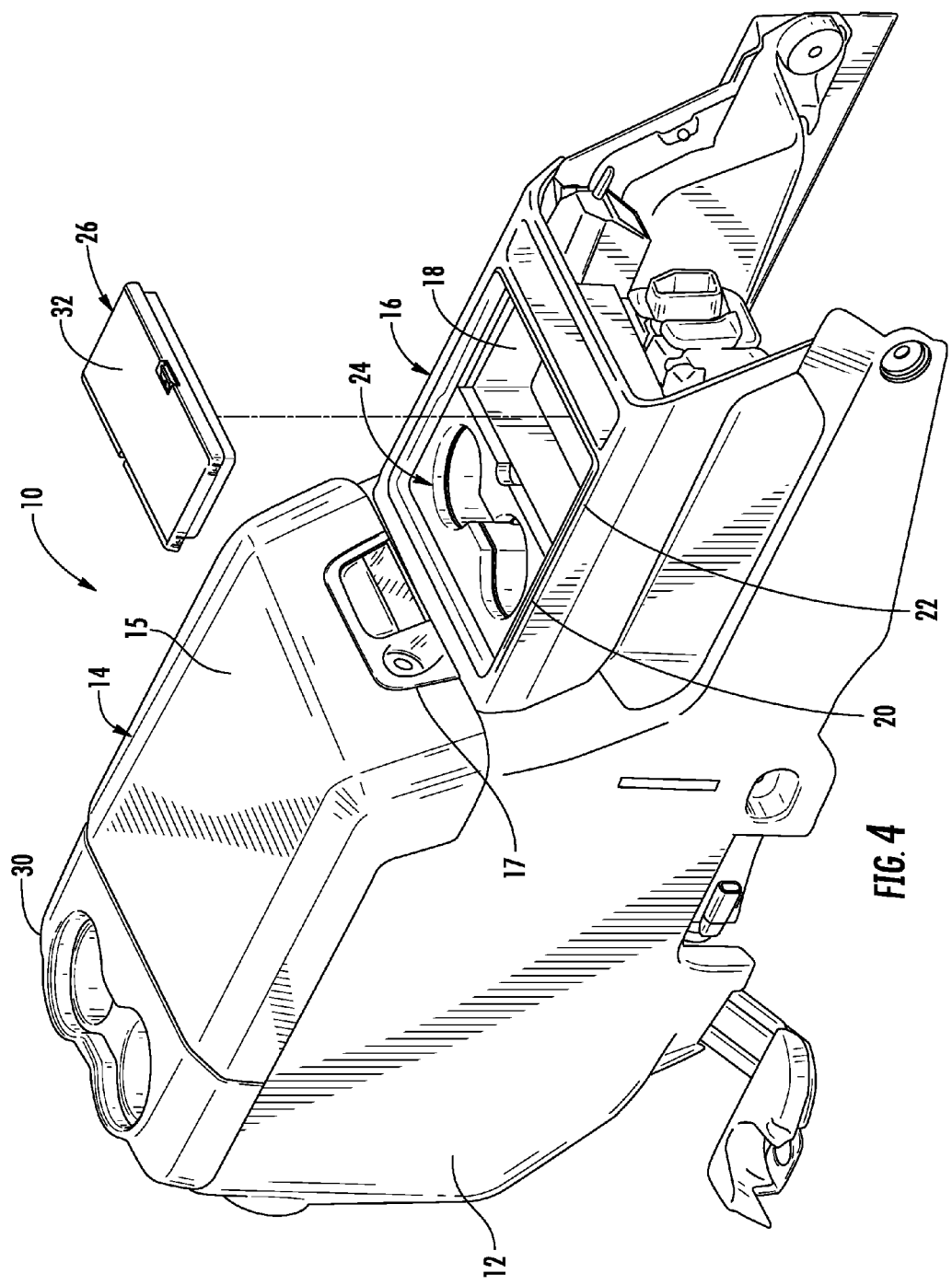
FIG. 4 is a perspective view of the console assembly of FIG. 1 with the storage tray assembly removed.

Referring now to FIG. 4, the storage tray 26 has been removed from the lower console compartment 16, thereby providing full access to the second portion 22 of storage bin 18. The storage tray 26 is adapted to moveably couple to the storage bin 18 when fitted therein as further described below with reference to FIGS. 5A-6B. Being a removable item, the storage tray assembly 26 can be removed and taken with a user as the user exits the vehicle. The cover or lid 32 allows for such removal without having to worry about the contents of the storage tray assembly 26 being removed therefrom.

Figure 5A:
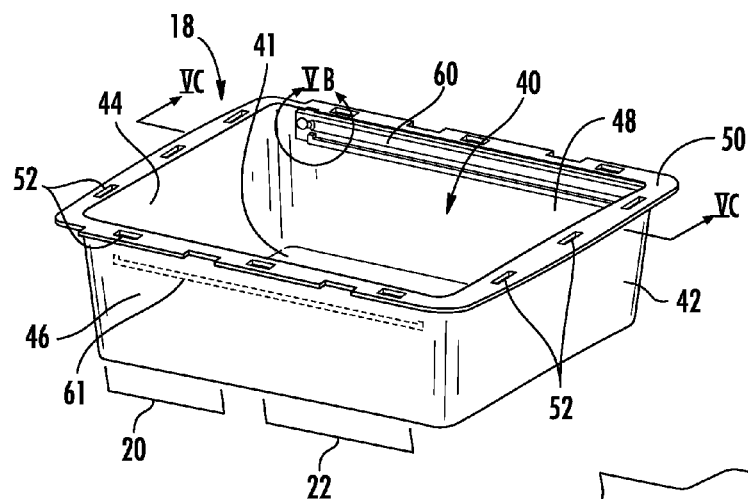
FIG. 5A is a perspective view of a lower compartment assembly.

Referring now to FIG. 5A, the housing or storage bin 18 is shown having a compartment 40 defined by a bottom surface 41, a front wall 42, a rear wall 44 and first and second side walls 46, 48. The first and second side walls 46, 48 are disposed in a generally parallel spaced apart relationship and extend upwardly from the bottom surface 41. The front wall 42 and the rear wall 44 are also generally disposed in a parallel spaced apart relationship and connect the first and second side walls 46, 48 to further define the upwardly opening storage area or compartment 40. The storage bin 18 further comprises a rim portion 50 having a plurality of apertures 52 disposed thereon which are used to fasten the storage bin 18 to the console assembly 10. The first and second side walls 46, 48 include travel tracks or track members 60, 61 disposed on an upper interior portion thereof, such that the track members are disposed within the compartment 40 and generally run the length of the first and second side walls 46, 48 in a parallel configuration. The track members 60, 61 are reciprocal or mirror images of one another, and will be further described below with specific reference to track member 60 alone.

Figure 5B:
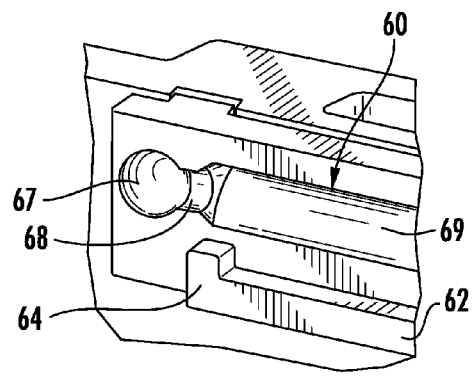
FIG. 5B is a fragmentary perspective view of a lower compartment assembly taken at location VB of FIG. 5A.
Figure 5C:
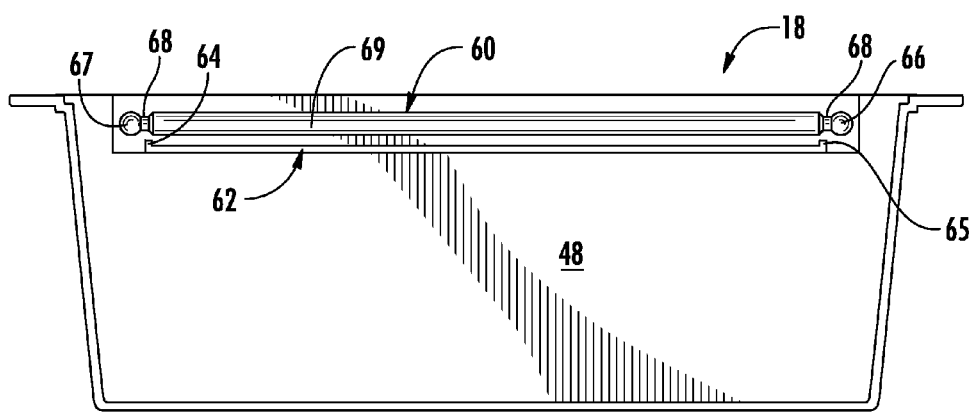
FIG. 5C is a cross sectional view of the lower compartment taken along line VC of FIG. 5B.

Referring now to FIGS. 5B and 5C, track member 60 includes a detent track 69 having front and rear detent pockets 66, 67 disposed at opposite or terminal ends of the track member 60. Ramp members 68 are disposed between the detent track 69 and the front and rear detent pockets 66, 67. Thus, the storage bin 18, shown in FIG. 5A, comprises a first track member 60 and a second track member 61 each having front and rear detent pockets 66, 67 disposed at terminal or opposite ends thereof for pivotally supporting the storage tray 26. Detent track sections 69 slidably support the tray assembly 26 along a length of the bin 18 as further described below. As best shown in FIGS. 5B-5C with specific reference to track member 60, a guide member 62 is disposed adjacent to and below the detent track 69 and further includes a first stop feature 64 and a second stop feature 65 for guiding and limiting the travel of the storage tray 26 when slidably supported on the track member 60. The detent pockets 66, 67 are in the form of socket joints or concave pocket depressions for rotatably receiving engagement features of the storage tray assembly 26 as further described below. Thus, the detent pockets 66, 67 are hemispherically-shaped detent pockets that create a pivot point feature for the storage tray 26 when a mating feature of the storage tray 26 is engaged therein. The detent ramps 68, shown in FIG. 5C, are adapted to generate interference to a mating feature on the storage tray 26 thereby creating tactile feedback to the user in the form of a "click" effect as a user moves the storage tray assembly 26 between fore and aft positions. In this way, the user feels the storage tray 26 engage with either of the front or rear detent pockets 66, 67 and then knows that the storage tray 26 can be suitably rotated in a forward or reward direction as further described below.

Figure 6A:
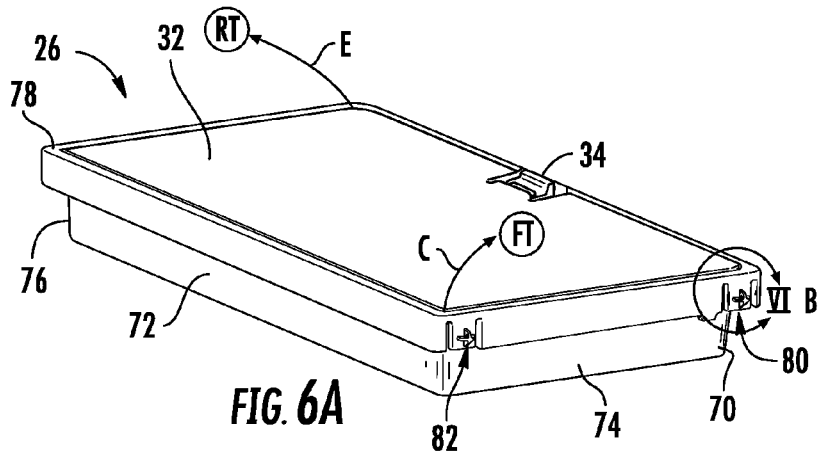
FIG. 6A is a rear perspective view of a removable storage tray assembly.
Figure 6B:
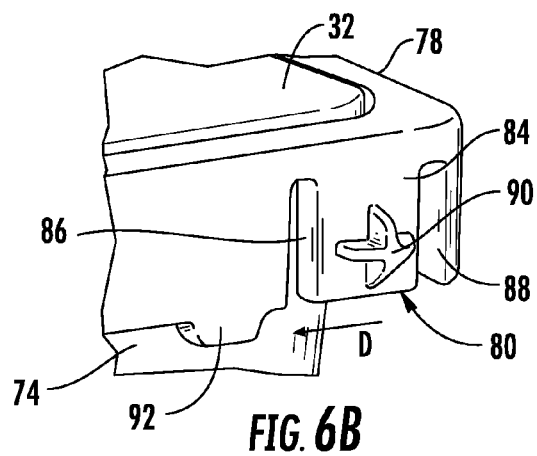
FIG. 6B is a fragmentary perspective view of the storage tray assembly of FIG. 6A taken at location VIB.
Figure 6C:
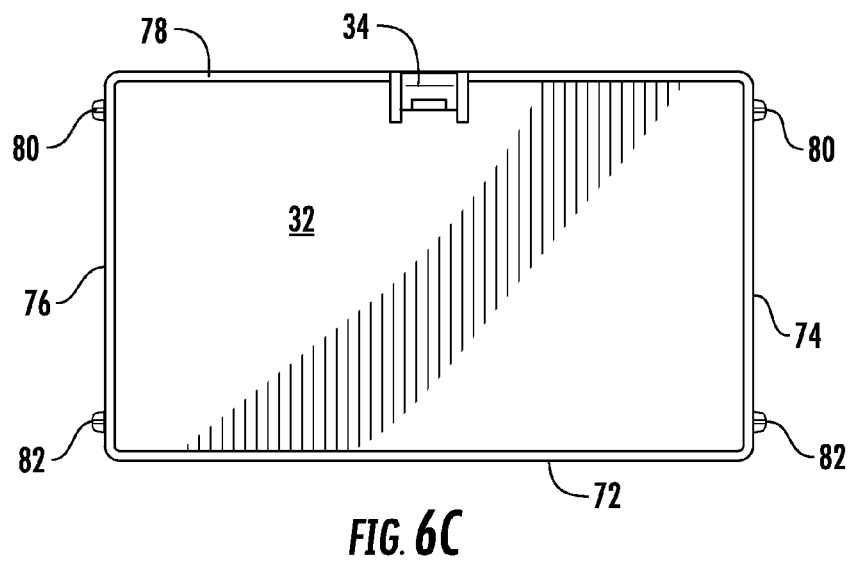
FIG. 6C is a top plan view of the storage tray assembly of FIG. 6A.

Referring now to FIGS. 6A-6B, the storage tray 26 is shown having a front wall 70, a rear wall 72 and first and second side walls 74, 76, which generally define the parameters of the storage compartment 35 shown in FIG. 2. The tray assembly 26, in this embodiment, further includes a rim portion 78 which essentially comprises a molded overturned portion of the front wall 70, rear wall 72 and side walls 74, 76 disposed about the storage tray 26. The rim portion 78 includes a first set and a second set of engagement tabs 80, 82 which are disposed along the side walls 74, 76 at opposite ends thereof. As shown in FIG. 6A, the first set of engagement tabs 80 are disposed in a car-forward position relative to the second set of engagement tabs 82. In assembly, the first set of engagement tabs 80 and the second set of engagement tabs 82 are adapted to be slidably received in the detent tracks 69 of the track members 60, 61 disposed on the side walls 46, 48 of bin 18 shown in FIG. 5A. Thus, in the embodiment shown in FIG. 6A, the tray assembly 26 includes an engagement tab generally disposed on all four corners of the tray assembly 26 with the first set of engagement tabs 80 being disposed in a car-forward position and the second set of engagement tabs 82 being disposed in a car-rearward position. The engagement tabs of the first and second set of engagement tabs 80, 82 are exemplified in FIG. 6B which will be used to describe the features and function of both sets of engagement tabs 80, 82 as disposed in all four corners of the tray assembly 26 as best shown in FIG. 6C.

Referring to FIG. 6B, the first and second set of engagement tabs 80, 82 generally comprise a resilient finger portion 84 that is flexibly disposed on the rim portion 78 of the tray assembly 26. The finger portion 84 is flexibly resilient due to reliefs 86, 88 disposed on either side of the finger portion 84, such that the finger portion 84 acts as a living hinge. In this way, the finger portion 84 can move inwardly towards the side wall 74, as shown in FIG. 6B, in a path indicated by arrow D to a deformed position from an at rest position. Each finger portion 84 comprises a protruding engagement member 90 which is adapted to be received in the track members 60, 61 of the storage bin 18. The engagement members 90 are slidably received within the track members 60, 61, such that the storage tray 26 can slide within the bin 18 between fore and aft positions between the first portion 20 and second portion 22 of storage bin 18. The engagement members 90 allow for a snap-fit engagement of the storage tray assembly 26 within the track members 60, 61 of the storage bin 18 due to the flexibility of the resilient fingers 84 on which the engagement members 90 are disposed. The engagement members 90, as shown in FIG. 6B, further comprises a hemispherical shape such that the engagement members 90 act as a mating feature to detent pockets 66, 67 disposed at forward and rearward ends of the track members 60, 61. In this way, the tray assembly 26 can slide to the fore position FP, as shown in FIG. 7E, such that the first set of engagement tabs 80 engage the front detent pockets 66 of the track members 60, 61 via engagement members 90. Once the engagement members 90 of the first set of engagement tabs 80 are engaged with the front detent pockets 66, the tray assembly 26 can be pivotally rotated forward in a direction as indicated by arrow C, as shown in FIG. 7I, to a forward tilt position FT. Similarly, the tray assembly 26 can be moved to a rearward position or aft position, shown in FIG. 7H, such that the second set of engagement tabs 82 similarly couple with the rear detent pockets 67 of the track members 60, 61. Once engaged therewith, the tray assembly 26 can be tilted in a direction as indicated by arrow E to a rearward tilt position RT, as shown in FIG. 7H.

Referring again to FIG. 5A, the storage bin 18 is shown having the container holder assembly 24, FIG. 1, removed such that the first and second portions 20, 22 of the storage bin 18 are accessible. With the container holder assembly 24, removed the storage tray 26 can slide between the first and second portions 20, 22 of the storage bin 18 between fore and aft positions as the track members 60, 61 generally run the length of the side walls 46, 48 of the storage bin 18. As shown in FIG. 6B, the storage assembly 26 further includes a stop member 92 which is adapted to engage the stop feature 64 disposed on the guide member 62 within the storage bin 18 to ensure that the storage tray 26 does not travel beyond engagement with either of the front or rear detent pockets 66, 67.

Figure 7C:
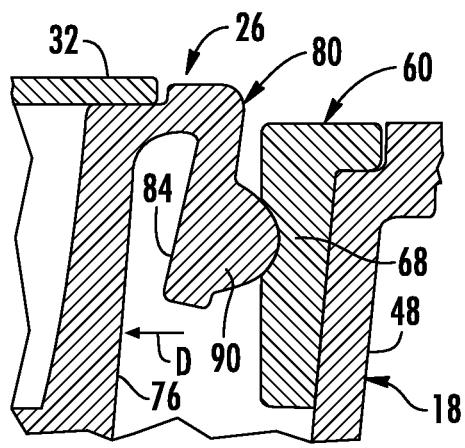
FIG. 7C is a fragmentary side elevational view of the storage tray assembly and lower compartment assembly of FIG. 7B showing an engagement tab in a deformed position.
Figure 7D:
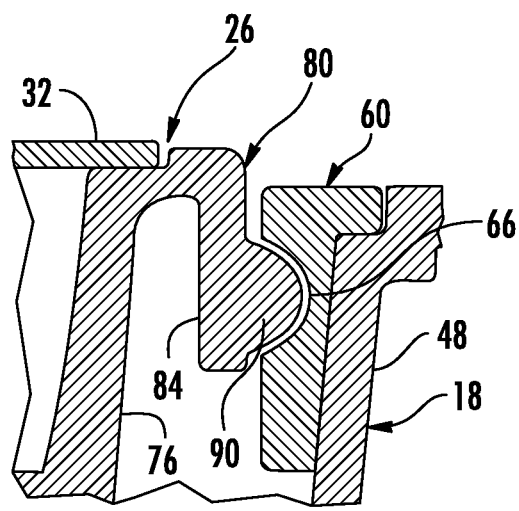
FIG. 7D is a fragmentary side elevational view of the storage tray assembly and lower compartment assembly of FIG. 7B showing an engagement tab disposed in a decent pocket.
Figure 7E:
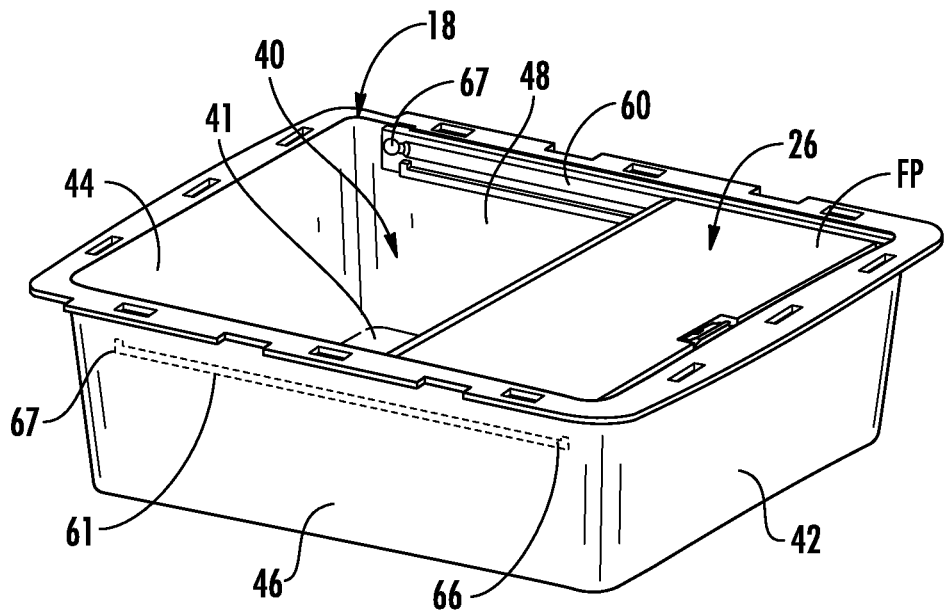
FIG. 7E is a perspective view of the storage tray assembly disposed in the lower compartment assembly in a fore position.
Figure 7F:
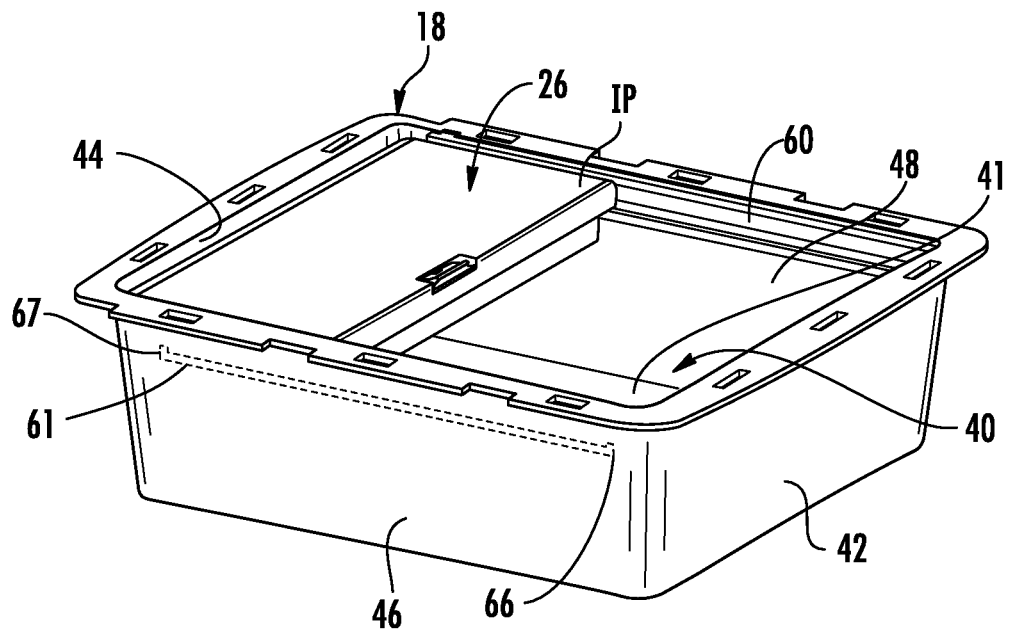
FIG. 7F is a perspective view of the storage tray assembly and lower compartment assembly of FIG. 7E having the tray assembly in an aft position.

Referring now to FIGS. 7A-7D, the tray assembly 26 is shown disposed in the bin 18 with the first or front set of engagement tabs 80 shown disposed in the detent tracks of the track members 60, 61, respectively. As shown in FIG. 7B, the finger portion 84 of engagement tab 80 is adapted to deform from an at rest position, shown in FIG. 7B, to a deformed position shown in FIG. 7C, wherein the protruding engagement member 90 is engaged with a ramp member 68 disposed on the track member 60. In this way, the tray assembly 26 provides the tactile feature described above as the protruding engagement member 90 moves towards engagement with the detent socket 66 shown in FIG. 7D where the engagement member 90 clicks into engagement with detent pocket 66.

Figure 7G:
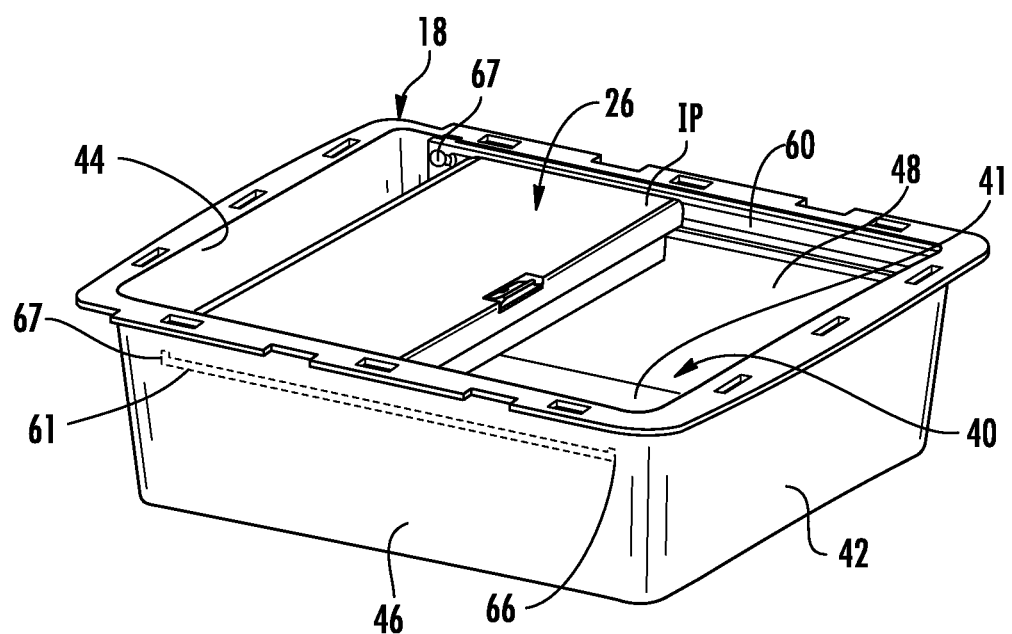
FIG. 7G is a perspective view of the storage tray assembly and lower compartment assembly of FIG. 7E showing the tray assembly in an intermediate position.
Figure 7H:
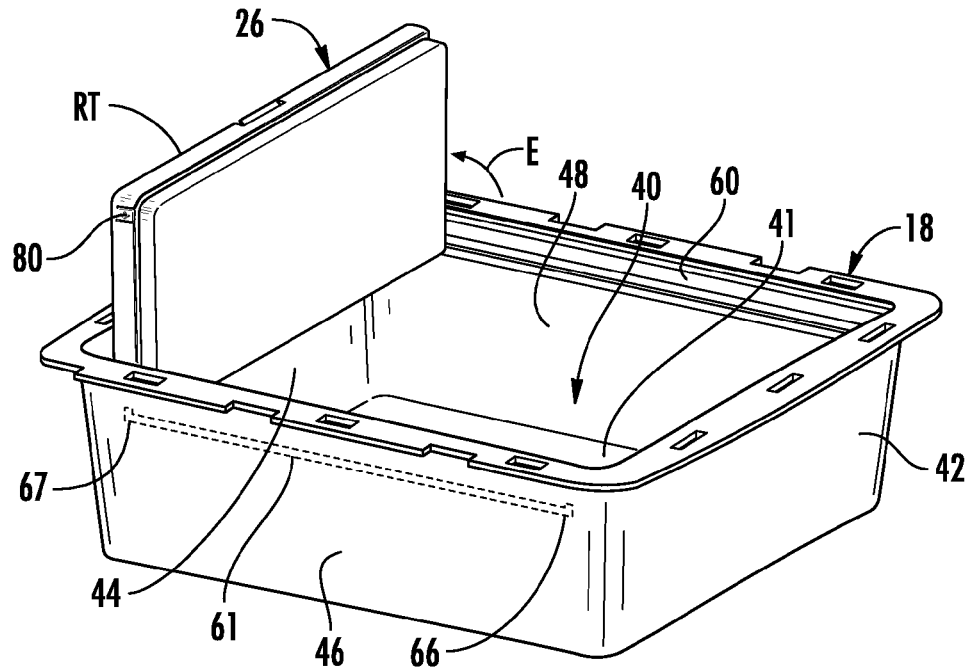
FIG. 7H is a perspective view of the storage tray assembly and lower compartment assembly of FIG. 7E showing the tray assembly in a rearward tilt position.
Figure 7I:
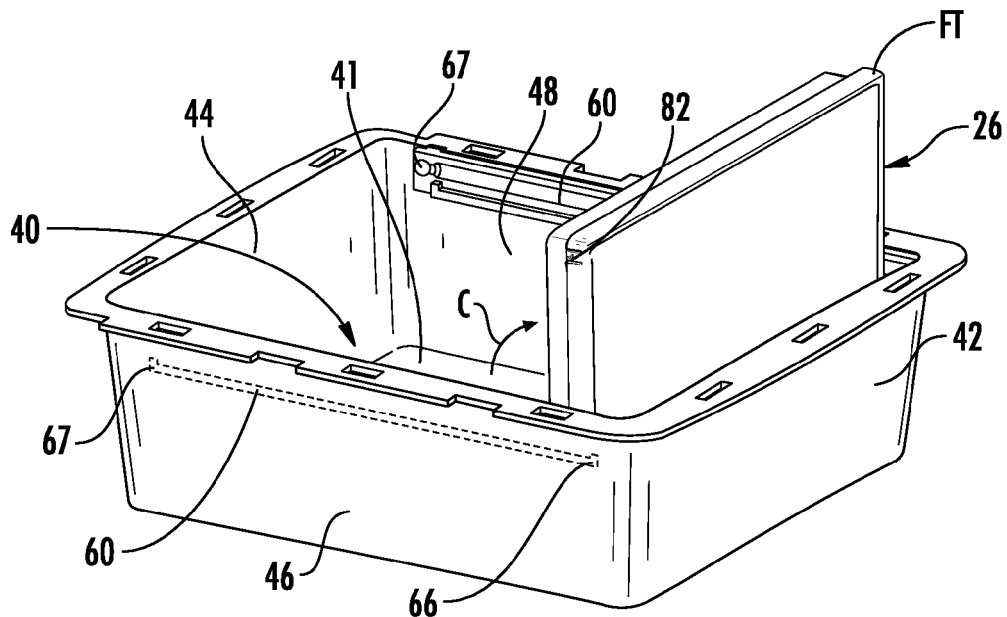
FIG. 7I is a perspective view of the storage tray assembly and the lower compartment assembly of FIG. 7E showing the tray assembly in a forward tilt position.

Thus, as described above, the tray assembly 26 can be moved to a variety of positions within the storage bin 18 as best shown with reference to FIGS. 7E-7I. Specifically, as shown in FIG. 7E, the tray assembly 26 is in the fore position FP, wherein the protruding engagement members 90 of the first set of engagement tabs 80 are engaged with the front detent pockets 66 of the track members 60, 61. In the fore position FP, the second set of engagement tabs 82 are engaged with the detent tracks 69 of the track members 60, 61 via protruding engagement members 90. From the fore position FP, the tray assembly 26 can be moved to the aft position AP shown in FIG. 7F. As described herein, the fore and aft positions FP, AP are positional references relative to the console assembly 10, as shown in FIG. 1. However, it is contemplated that the bin 18 and the storage tray assembly 26 could be oriented in the console assembly 10 to provide lateral movement of the tray assembly 26 within the storage bin 18. In the aft position AP, shown in FIG. 7F, the second set of engagement tabs 82 are disposed in or engaged with the rear detent pockets 67 of the first and second track members 60, 61 disposed on the side walls 46, 48 of the storage bin 18. Thus, the first set of engagement tabs 80 are disposed in the detent tracks 69 of the first and second track members 60, 61 when the tray assembly 26 is in the aft position AP. As shown in FIG. 7G, the tray assembly 26 is disposed in an intermediate position IP between the fore position FP and aft position AP, wherein the first and second sets of engagement tabs 80, 82 are both disposed in the detent tracks 69 along the first and second track members 60, 61. From the aft position AP, the tray assembly 26 can be rotated to the rearward tilt position RT along a path as indicated by arrow E, wherein the second set of engagement tabs 82 are pivotally coupled or pivotally engaged with the rear detent pockets 67 via the protruding engagement members 90. Thus, as shown in FIG. 7H, the first set of engagement tabs 80 have been disengaged from the detent tracks 69 of the first and second track members 60, 61. The first set of engagement tabs 80 are disengaged from the track members 60, 61 by a force applied to the tray assembly 26 by the user in a direction as indicated by arrow E towards the rear tilt position RT such that the resilient finger portions 84 of the first engagement tabs 80 deform to release the protruding engagement members 90 from the detent tracks 69. Similarly, as shown in FIG. 7I, the tray assembly 26 has been moved from the fore position FP, as shown in FIG. 7E, to a forward tilt position FT along a path as indicated by arrow C. In the forward tilt position FT, the tray assembly 26 is engaged with the bin 18 via the first set of engagement tabs 80 which are rotatably coupled or pivotally engaged to the forward detent pockets 66 of track members 60, 61. As further shown in FIG. 7I, the second set of engagement tabs 82 have been disengaged with the track members 60, 61.

Thus, as shown in FIGS. 7H and 7I, the tray assembly 26 can be tilted to the forward tilt position FT and the rearward tilt position RT thereby providing greater access to the compartment 40 of the bin 18. In this way, the user can tilt the tray assembly 26 in either a forward or rearward direction to place a larger item in the storage compartment 40 without having to fully remove the tray assembly 26. The storage compartment cover 32 of the tray assembly 26 covers the storage compartment 35, such that items stored therein are retained within the storage compartment 35 during the tilting of the tray assembly 26.

Figure 13:
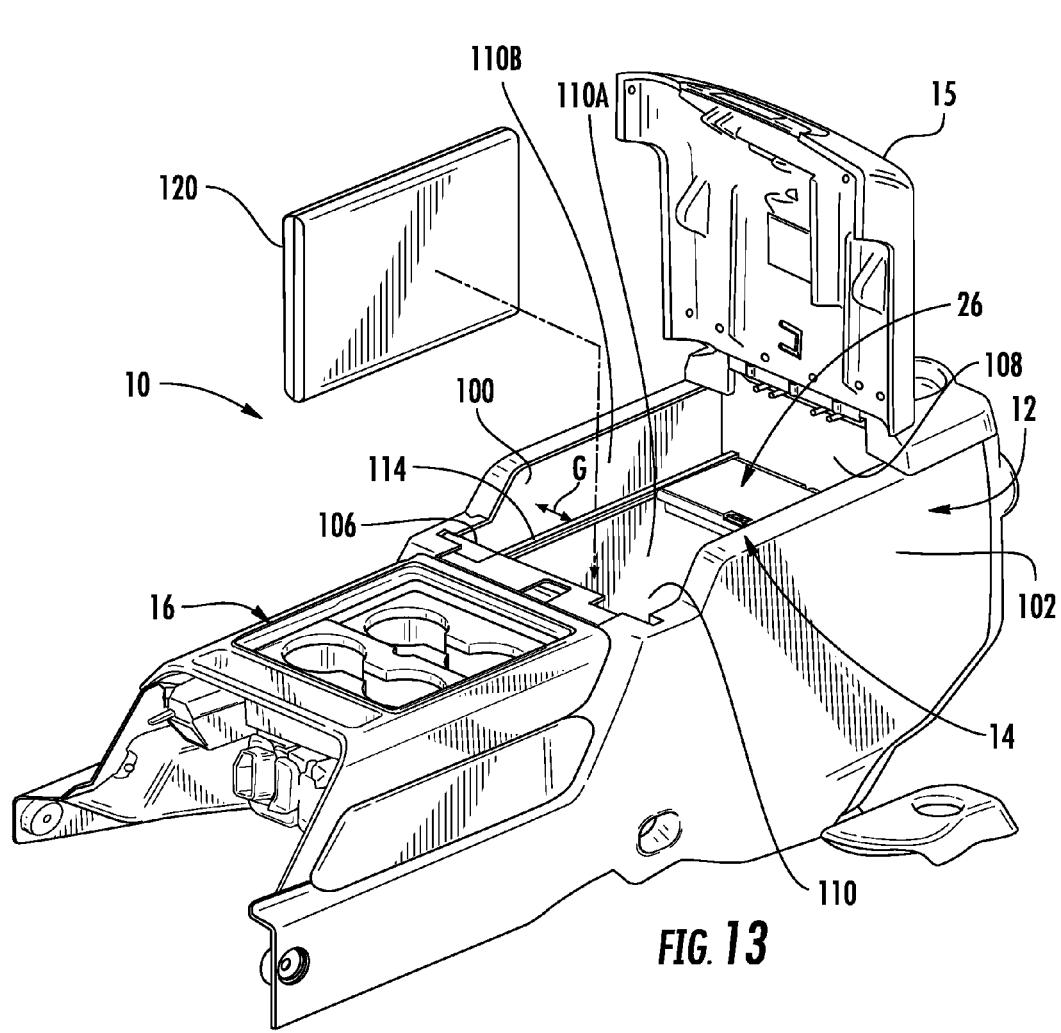
FIG. 13 is a perspective view of the console assembly of FIG. 10 showing a portable electronic device being stored in a space defined between a side track member and the console housing.

Referring now to FIG. 8, the console assembly 10 is shown having the tray assembly 26 removed from the lower compartment 16 for placement in the upper compartment 14. As further shown in FIG. 8, the cover or door 15 of the upper compartment 14 has been opened to provide access to a storage area 110 by moving the cover 15 in a direction as indicated by arrow A. The upper compartment 14 is defined by first and second side walls 100, 102 which are disposed in a generally parallel spaced apart relationship extending upwardly from a bottom surface 104. A front wall 106 and a rear wall 108 also extend upwardly from the bottom surface 104 and are generally spaced apart in a parallel relationship to define an upwardly opening storage area 110. As shown in FIG. 8, a track member 112 is disposed on the second side wall 102 of the upper compartment 14. As further shown in FIG. 8, a removable track member 114 is shown removed from the console assembly 10 and is adapted to be positioned within the storage area 110 and connected to the front and rear walls 106, 108, as best shown in FIG. 13. The track members 112, 114 are similarly configured to the track members 60, 61 described above in reference to bin 18, as best shown in FIG. 5C. In this way, the track members 112, 114 are adapted to receive the removable storage tray 26 in a sliding and rotating manner as further described below.

Figure 9:
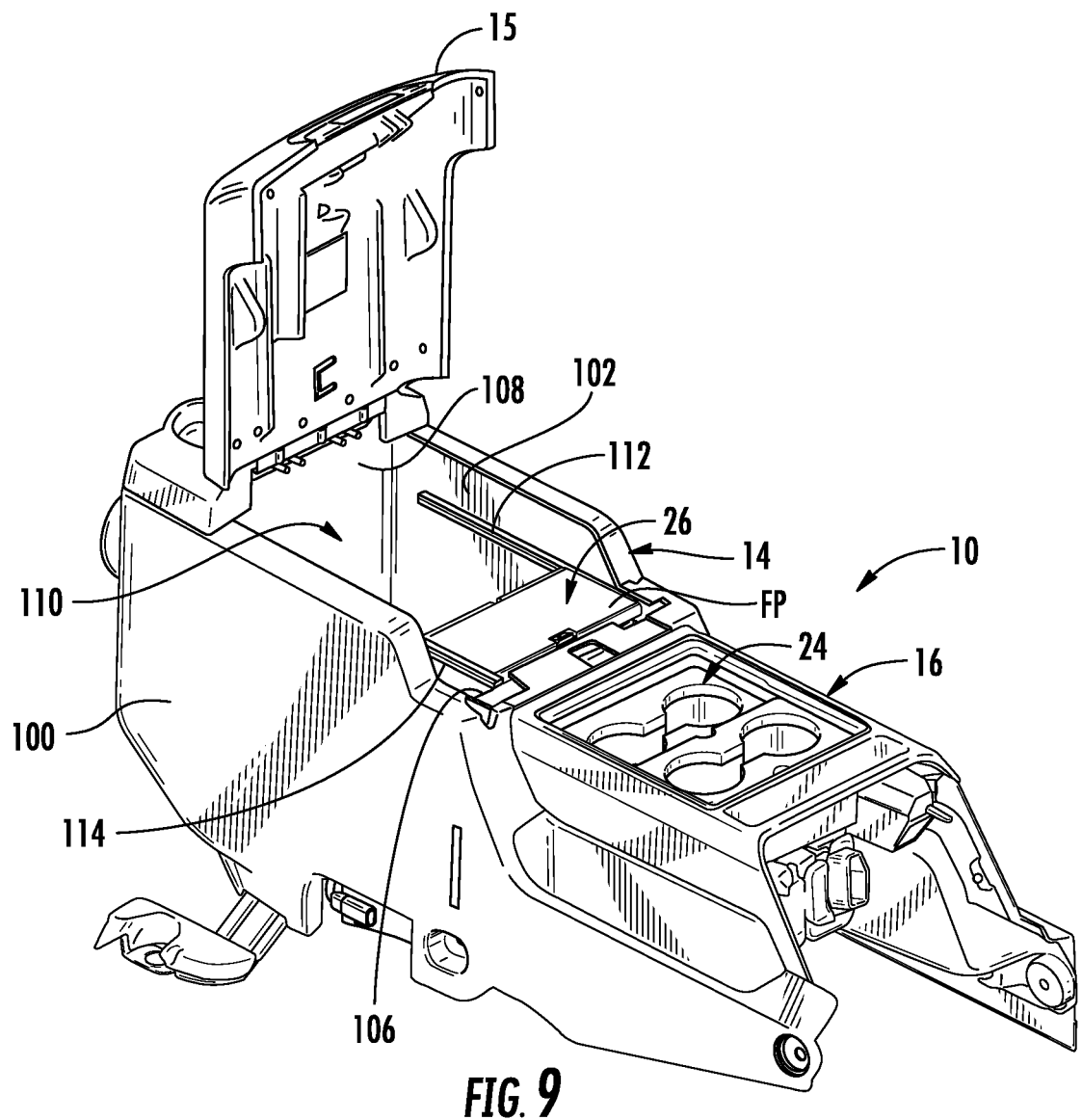
FIG. 9 is a perspective view of the console assembly of FIG. 8 having the storage tray assembly disposed in a fore position in the upper compartment.
Figure 10:
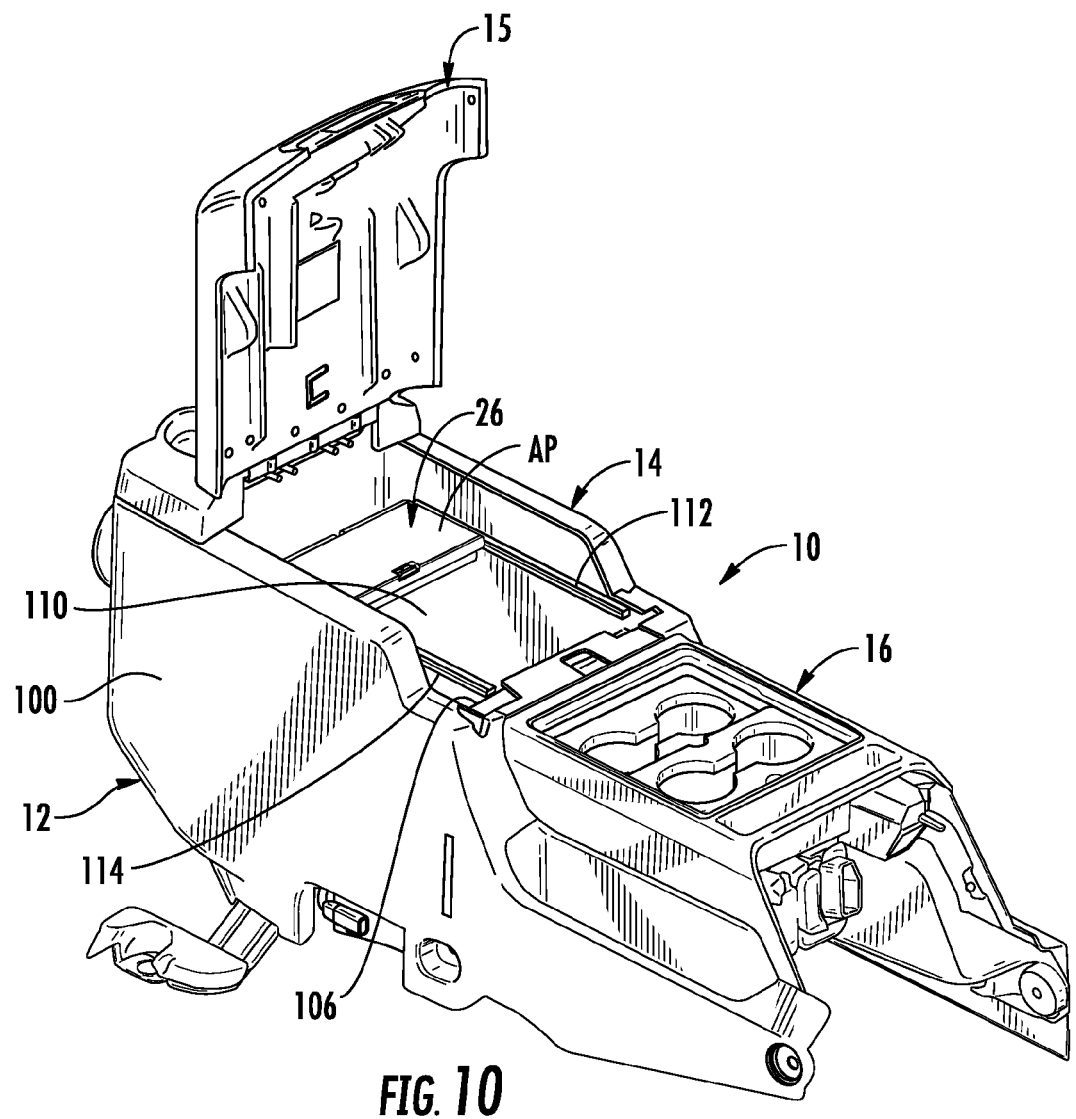
FIG. 10 is a perspective view of the console assembly of FIG. 9 having the storage tray assembly disposed in an aft position.
Figure 11:
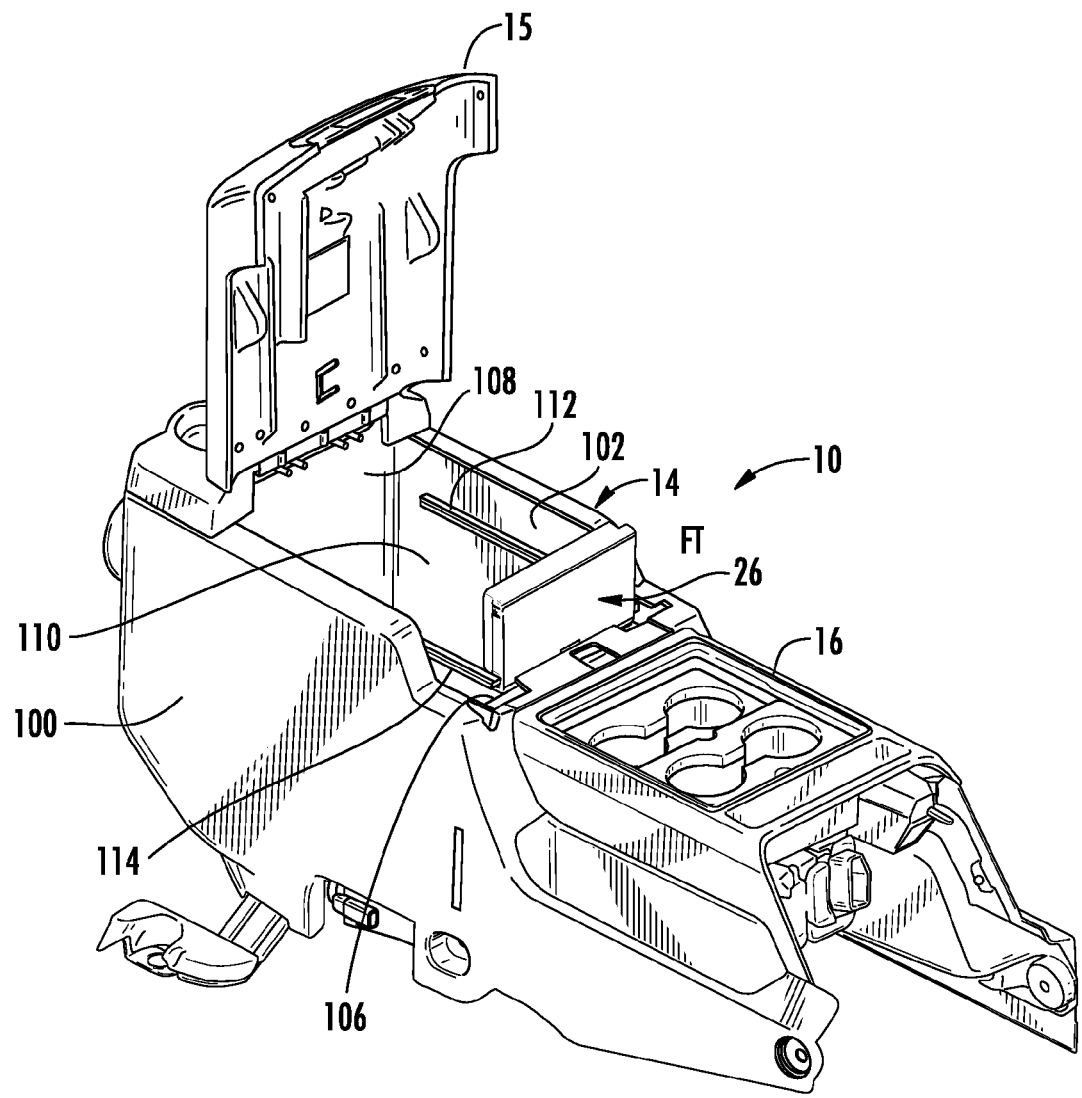
FIG. 11 is a perspective view of the console assembly of FIG. 9 having the storage tray in a forward tilt position.
Figure 12:
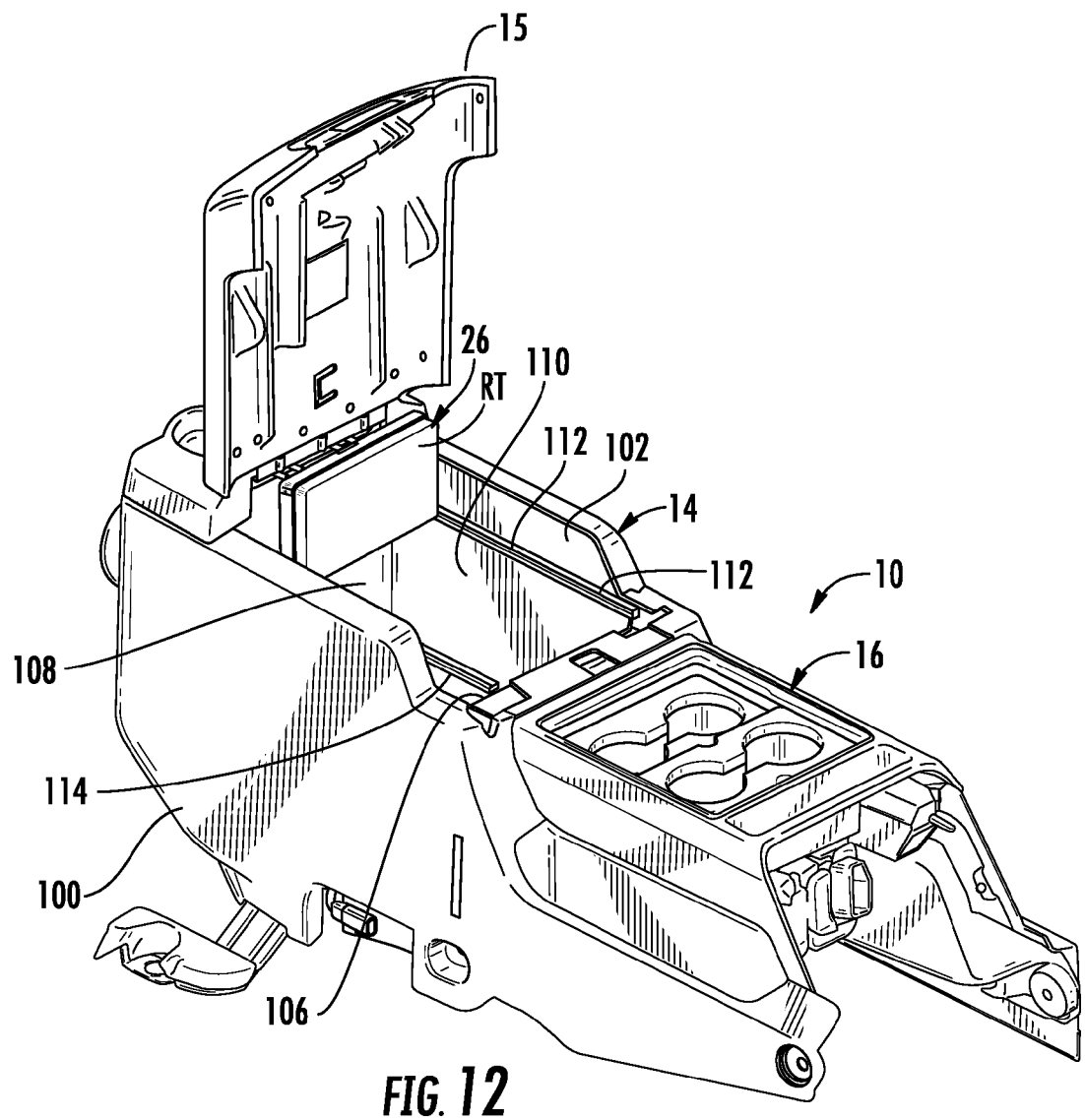
FIG. 12 is a perspective view of the console assembly of FIG. 10 having the storage tray in a rearward title position.

Referring now to FIGS. 9-12, the tray assembly 26 is disposed within the storage area 110 of the upper compartment 14 in a fore position FP. With the track members 112, 114 having the same configuration as track members 60, 61, the first and second sets of engagement tabs 80, 82 engage the track members 112, 114 such that the tray assembly 26 is slidably supported thereon between the fore position FP, and an aft position AP, as shown in FIG. 10. Thus, as the tray assembly 26 moves between the fore position FP and the aft position AP, the storage area 110 remains accessible. When a larger item must be stored in the storage area 110, the tray assembly 26 can be pivotally rotated on the track members 112, 114 in a manner as described above with reference to track members 60, 61 such that the tray assembly 26 can rotate to a forward tilt position FT, as shown in FIG. 11, and a rearward tilt position RT, shown in FIG. 12.

Figure 14:
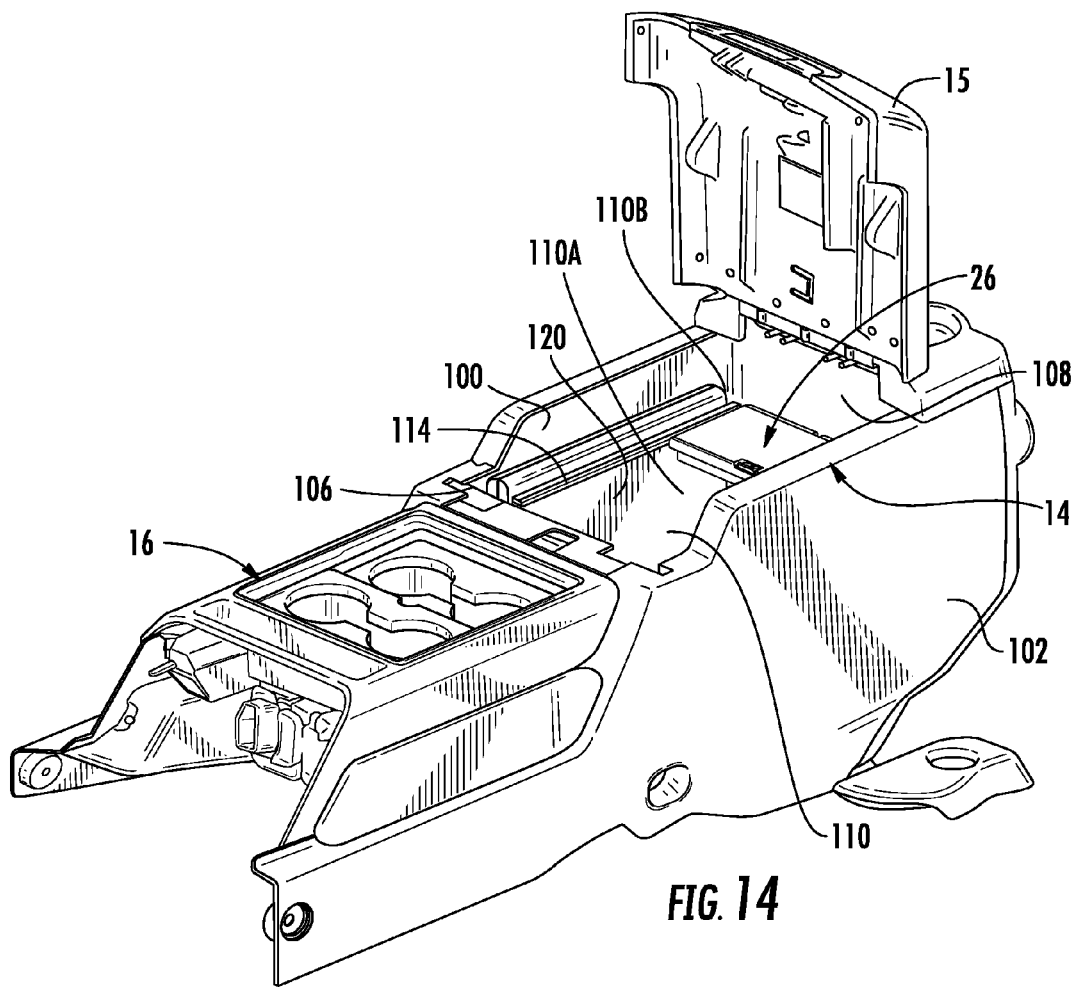
FIG. 14 is a perspective view of the console assembly of FIG. 13 having the portable electronic device stored in the space defined between the side track member and the console housing.

Referring now to FIG. 13, the track member 114 is coupled to the front wall 106 and rear wall 108 in a manner such that the track member 114 is spaced apart from side wall 100 as indicated by arrow G. In this way, the track member 114 divides the storage area 110 into first and second storage areas 110A, 110B. In assembly, the tray assembly 26 is disposed over the first storage area 110A as the tray assembly 26 moves along track members 112, 114. The second storage area 110B provides a retaining area to retain an item such as a laptop 120 shown in FIG. 13 being inserted into the retaining area 110B. With the track member 114 spaced apart from the side wall 100, the tray assembly 26 can move along the track members 114, 112 while the laptop 120 is retained in the retaining area 110B, as shown in FIG. 14.

Figure 15:
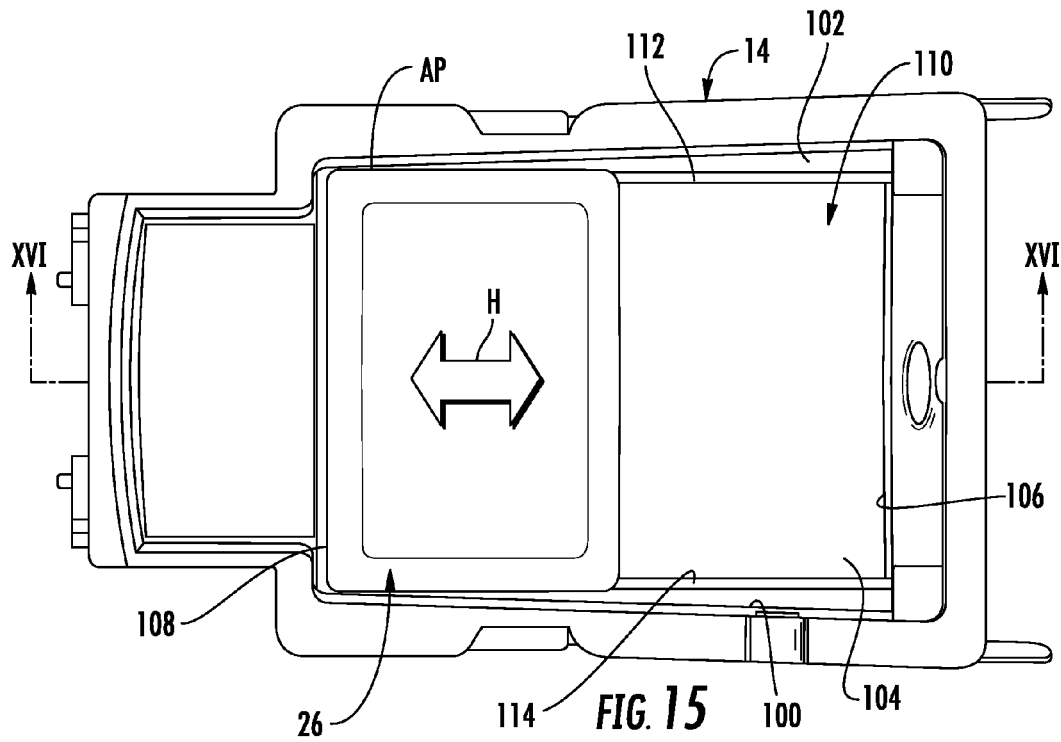
FIG. 15 is a top plan view of an upper compartment having a removable storage tray assembly disposed therein according to another embodiment of the present invention.
Figure 16:
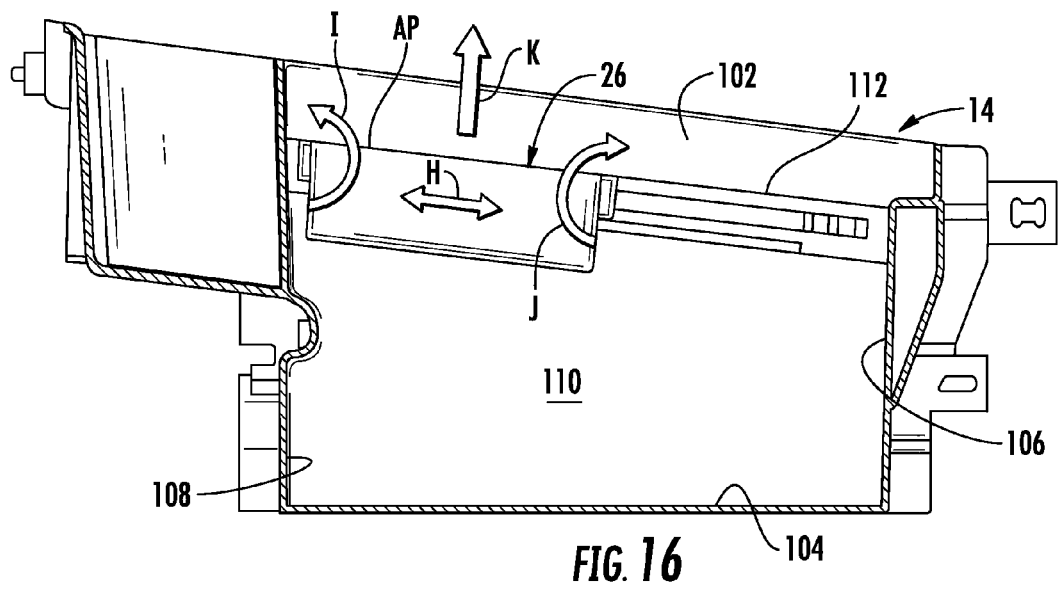
FIG. 16 is a cross-sectional view of the upper compartment and storage tray assembly of FIG. 15 taken at line XVI.

Referring now to FIGS. 15 and 16, the storage tray 26 is shown in the aft position AP of the upper compartment 14. The tray assembly 26 is slidably supported on track members 112, 114 between the aft position AP and a fore position FP in a direction as indicated by arrow H. As shown in FIG. 16, the tray assembly 26 can also be rotated from the aft position AP along a path as indicated by arrow I to a rearward tilt position RT. When moved to the fore position FP, the tray assembly 26 can be rotated forward in a direction as indicated by arrow J to a forward tilt position FT. Movement between position AP, FP, FT and RT shown in FIGS. 9-12, the storage tray 26 remains engaged with the track members 112, 114 while still providing access to the storage area 110. However, as noted with reference to FIGS. 8 and 16, the storage tray 26 can be removed from the upper compartment 14 in a direction as indicated by arrow K, thereby providing full unencumbered access to the storage area 110.

As described above, the tray assembly 26 can be disposed in the lower storage compartment 16 in a first configuration as shown in FIG. 1, and can be further disposed in the upper compartment 14 in a second configuration shown in FIG. 9. Thus, the tray assembly 26 is a removable tray assembly that can be disposed of either a first configuration in the lower compartment 16 or in a second configuration in the upper compartment 14. When disposed in either of the first or second configurations, the tray assembly 26 is slidable along track members between fore and aft positions and is further tiltable between a forward tilt and a rearward tilt position as described above. In this way, the removable storage tray 26 allows for maximum customization to accommodate a user's preference in assembly.

Figure 17:
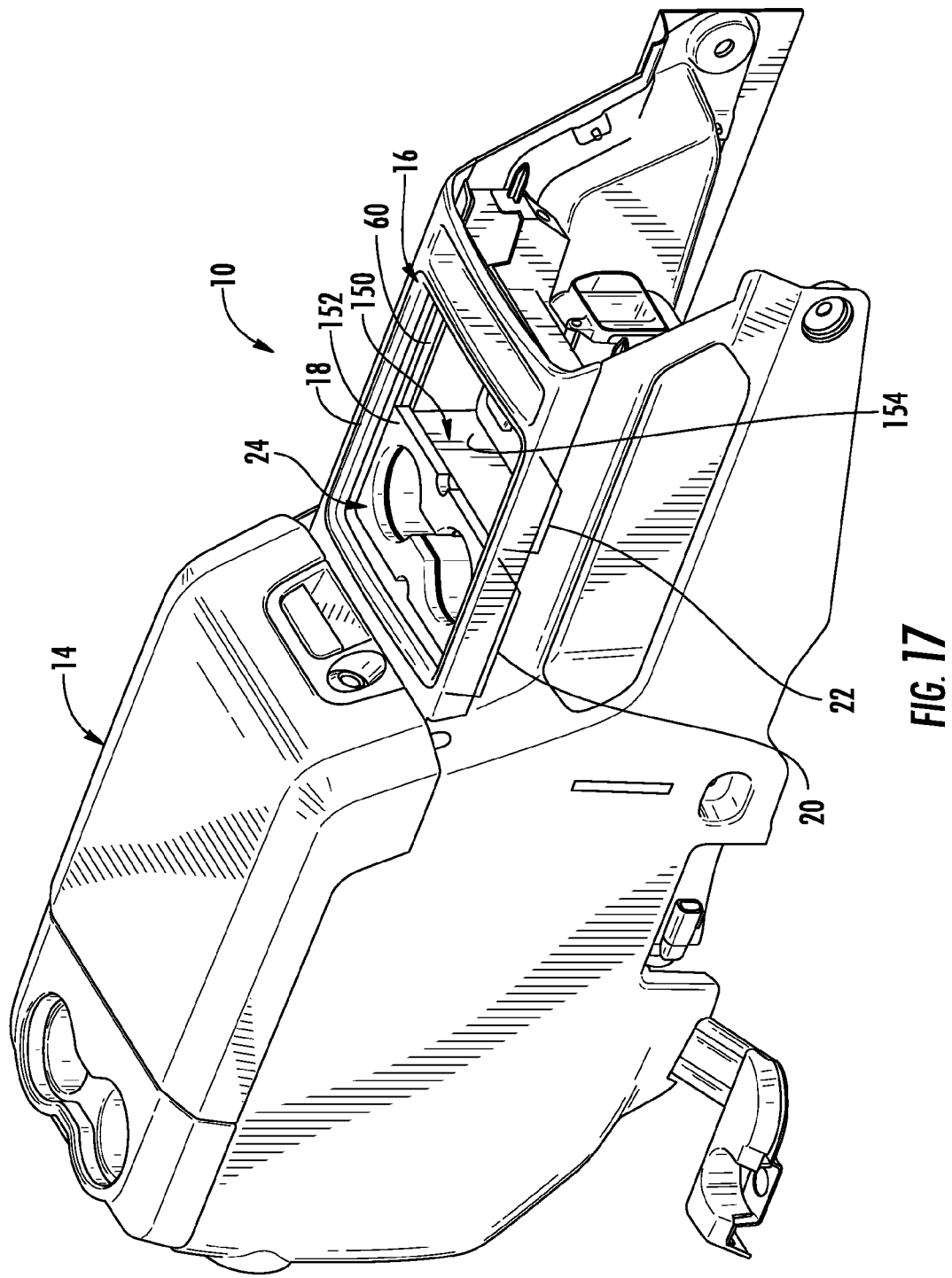
FIG. 17 is a perspective view of a console assembly having a container holder assembly according to another embodiment of the present invention.
Figure 20:
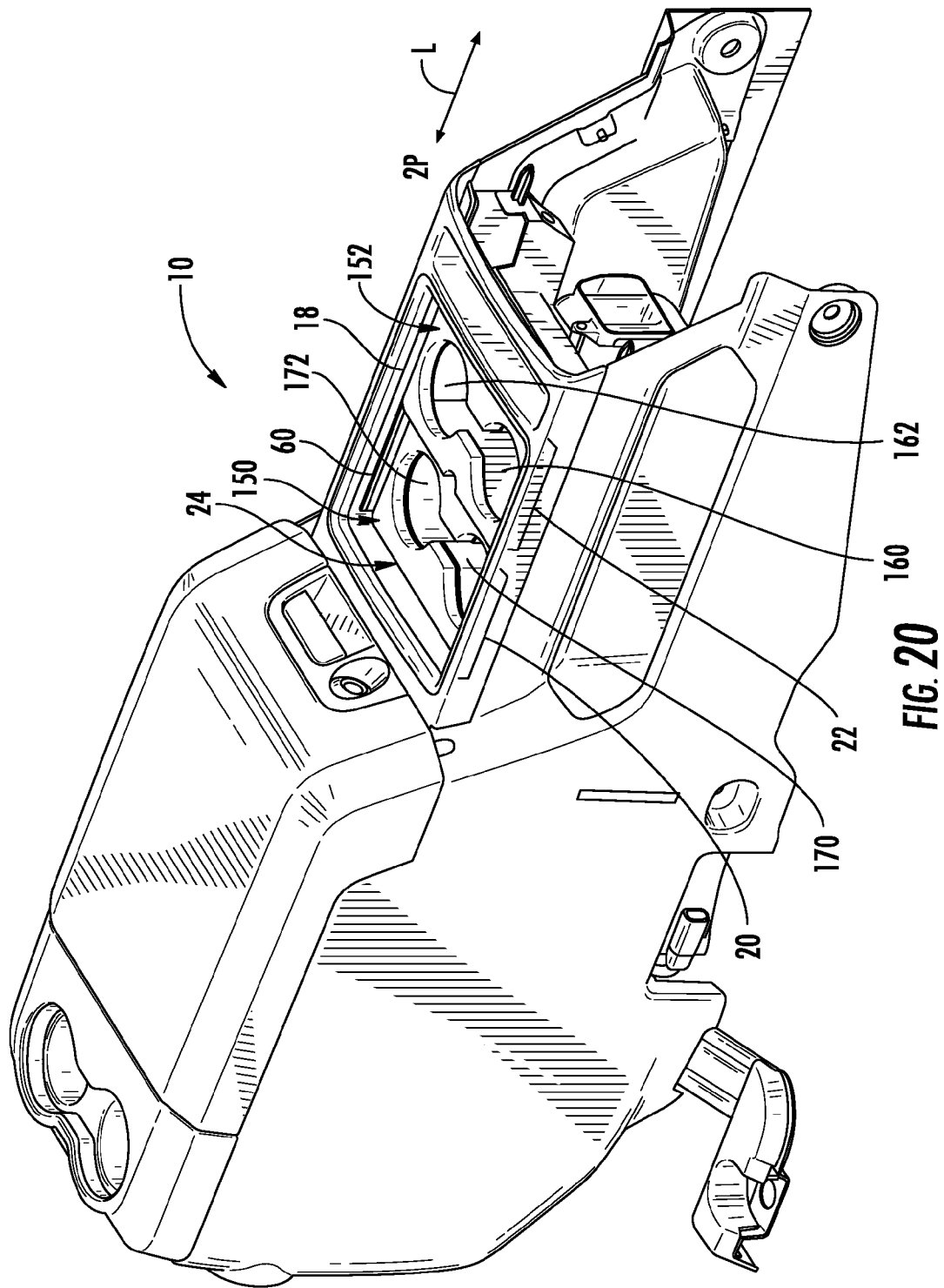
FIG. 20 is a perspective view of the console assembly of FIG. 17 having a container holder assembly with a panel assembly in a second position.

Referring now to FIGS. 17 and 20, the console assembly 10 is shown with the container holder assembly 24 disposed in a first portion 20 of the lower compartment 16. The container holder assembly 24 includes a base portion 150 disposed in a housing or bin member 18. An upper panel 152 is disposed over the base portion 150 and includes engagement tabs, similar to the first and second set of engagement tabs 80, 82 disposed on the storage tray assembly 26, for slidably coupling the upper panel 152 to track members 60, 61 disposed in the housing 18. Adjacent to the container holder assembly 24 a storage compartment 154 is disposed, which defines the remainder of the housing 18. Generally, the storage compartment 154 is an upwardly opening storage compartment disposed in the second portion 22 of the housing 18. As noted above, the upper panel 152 is slidably received on track members 60, 61 such that the upper panel 152 is slidable within the bin housing 18 between a first position 1P, shown in FIG. 17, and a second position 2P, shown in FIG. 20, along a path as indicated by arrow L. As shown in FIG. 20, the upper panel 152 has been moved forward on the track members 60, 61 of the bin housing 18 to the second position 2P, wherein the upper panel 152 is disposed over storage compartment 154. In this way, the container holder assembly 24 is a convertible container holder assembly adapted to store multiple containers, such as beverage containers, as further described below.

Figure 17A:
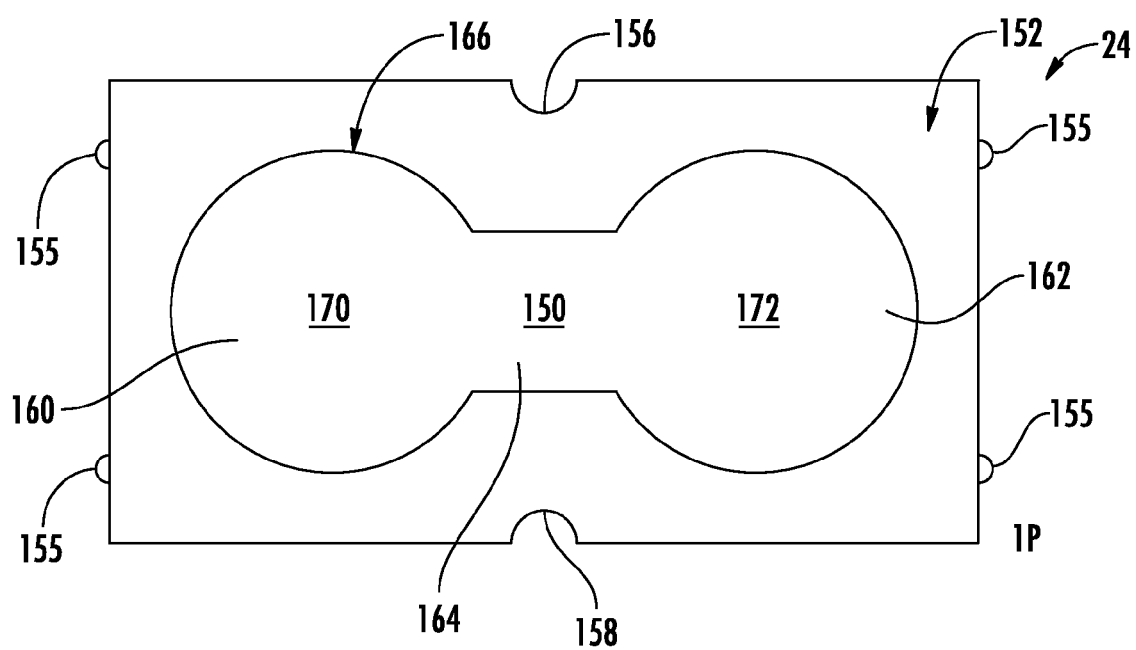
FIG. 17A is a top plan view of a container holder assembly having a panel in a first position.
Figure 17B:
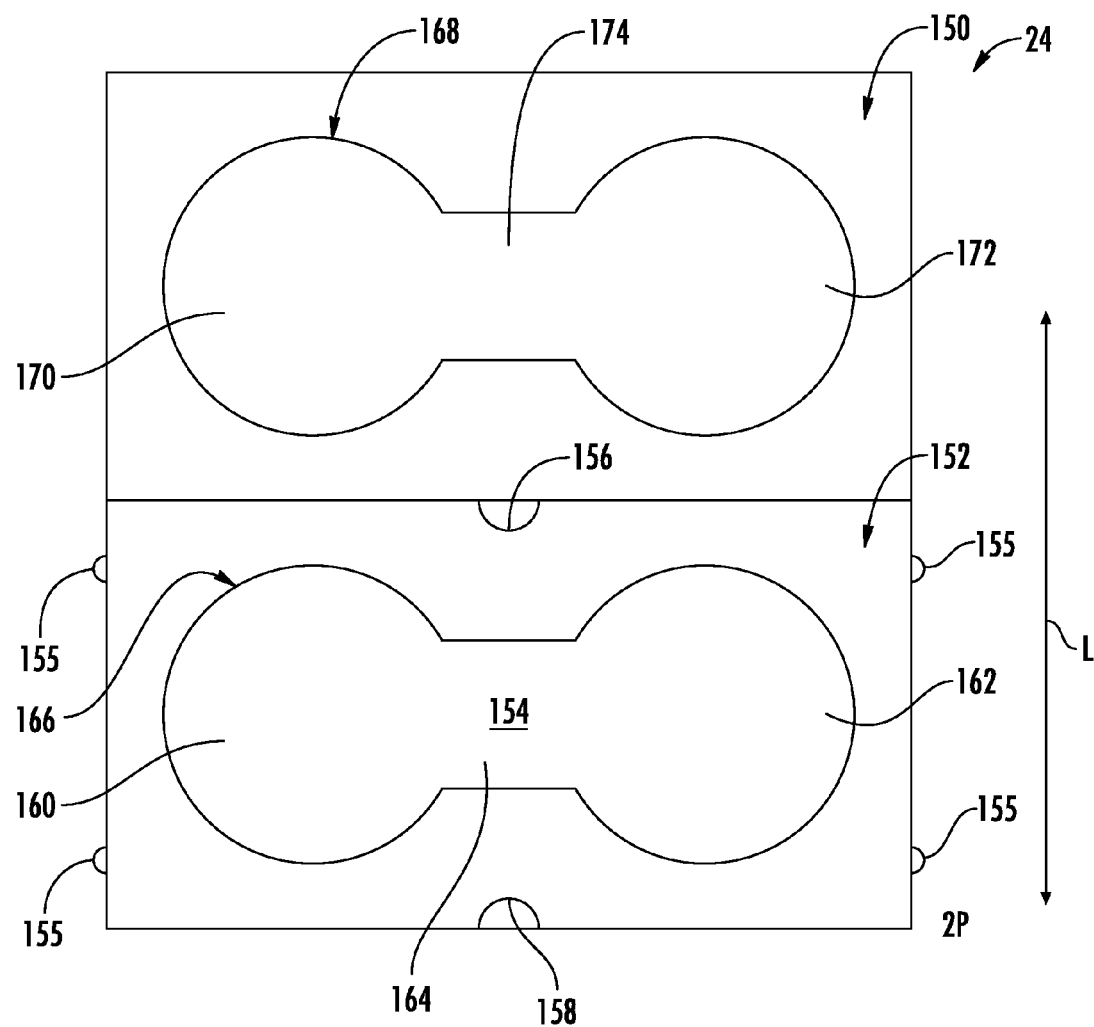
FIG. 17B is a top plan view of the container holder assembly of FIG. 17A having a panel in a second position.

Referring now to FIG. 17A, the container holder assembly 24 is shown having the upper panel portion 152 disposed over the base portion 150. The upper panel portion 152 includes engagement members 155 which are adapted to engage the track members 60, 61 of the bin housing 18 much like engagement members 90 described above with reference to the tray assembly 26. The upper portion 152 further comprises front and rear handle portions 156, 158, which are generally semicircular shaped cutouts or reliefs which are adapted to be pinched or grasped by the user, generally with a thumb and forefinger, to thereby engage and move the upper panel 152 from the first position 1P to a second position 2P, shown in FIG. 17B. The upper panel 152 includes first and second container retaining apertures 160, 162, which are generally in the form of circular apertures which are joined by a bridge relief section 164. Thus, in the embodiment shown in FIG. 17A, the upper panel 152 comprises a cutout section 166 made up of the retaining apertures 160, 162 as joined by the bridge 164. In this way, the cutout section 166 passes through the entirety of the thickness of the upper panel 152 and opens up into a cutout section 168 disposed in base portion 150 as shown in FIG. 17B. The cutout section 168 of the base portion 150 is defined by container wells 170 and 172 which are joined a bridge relief portion 174. Thus, the cutout or relief section 166 of the upper panel 152 closely mirrors the cutout or relief section 168 of the base portion 150, such that when the upper panel 152 is disposed in the first position 1P over the base portion 150, cutout sections 166 and 168 align such that the retaining apertures 160, 162 align with the container wells 170, 172 and the bridge portions 164, 174 of the upper panel 152 and base portion 150 further align to make for a uniform multi-cup holder configuration as shown in FIG. 17A. The bridge portions 164, 174 provide room for beverage containers that may have a handle member disposed thereon.

Referring now to FIG. 18, containers 180 and 182 are shown installed and retained in the container holder assembly 24. In this configuration, the panel 152 is in the first position 1P such that the retaining apertures 160, 162 are aligned with the container wells 170, 172 of the base portion 150. Thus, as shown in FIG. 18, the containers 180, 182 are retained in the container holder assembly 24 by both the retaining apertures 160, 162 of the upper panel 152, as well as the container wells 170, 172 of the base portion 150.

Figure 19:
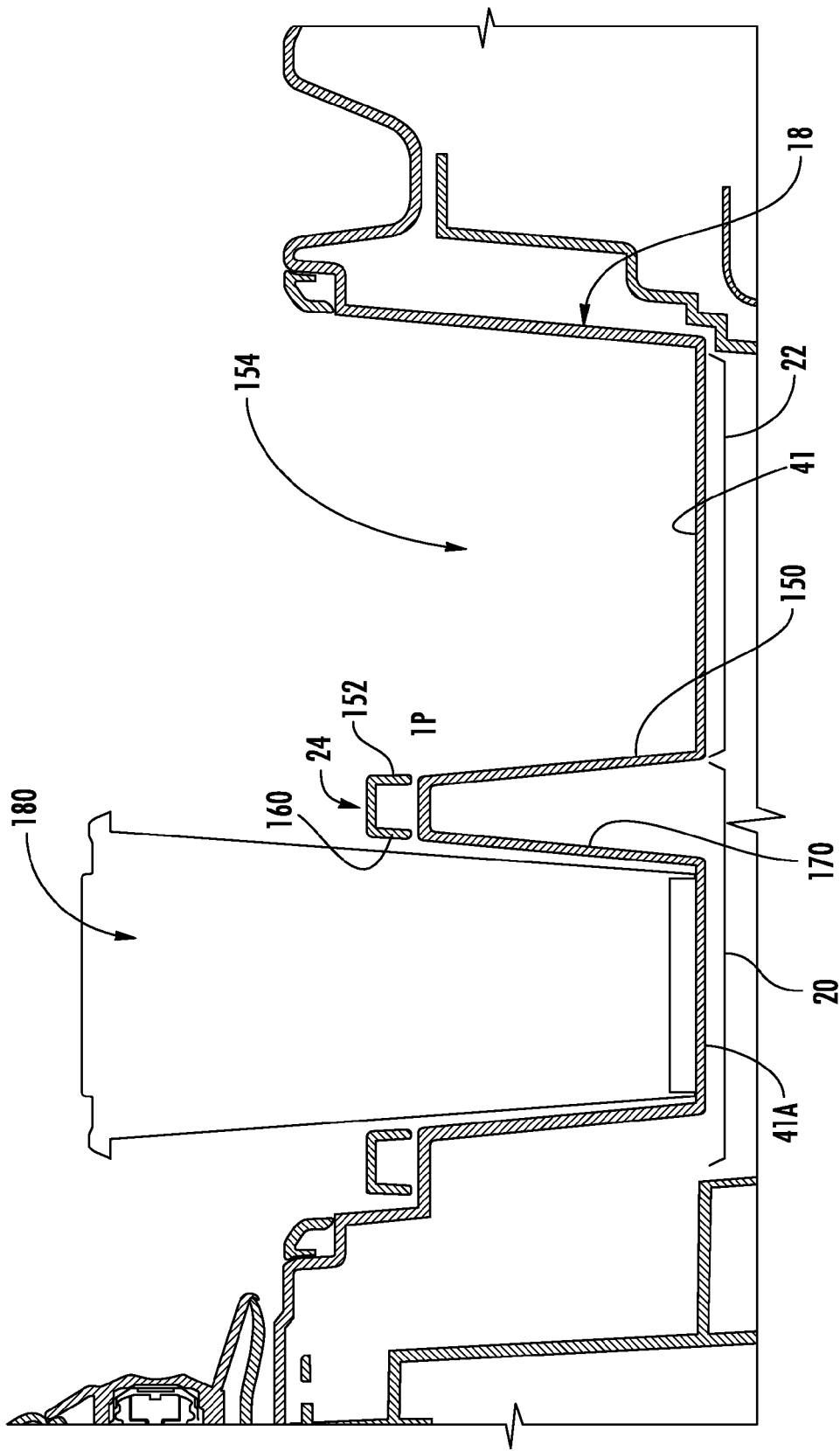
FIG. 19 is a fragmentary cross-sectional view of the console assembly of FIG. 18 taken along line XIX.

Referring now to FIG. 19, container 180 is shown disposed within retaining aperture 160 of the upper panel 152 and further supported in the container well 170 of the base portion 150. In this embodiment, the base portion 150 is a molded-in part that is incorporated into the bin 18. As noted above, a storage compartment 154 is disposed in a car-forward direction relative to the base portion 150. Thus, the base portion 150 is disposed in the first portion 20 of the bin 18 and the storage compartment 154 is disposed in the second portion 22 of the bin 18. It is noted that the containers 180, 182 shown in FIGS. 18 and 19 are in the form of beverage containers, such as travel coffee cups. As shown in FIG. 19 the container or coffee cup 180 is supported on a bottom surface 41A of the base portion 150 while being retained by the container well 170 and retaining aperture 160.

Figure 21:
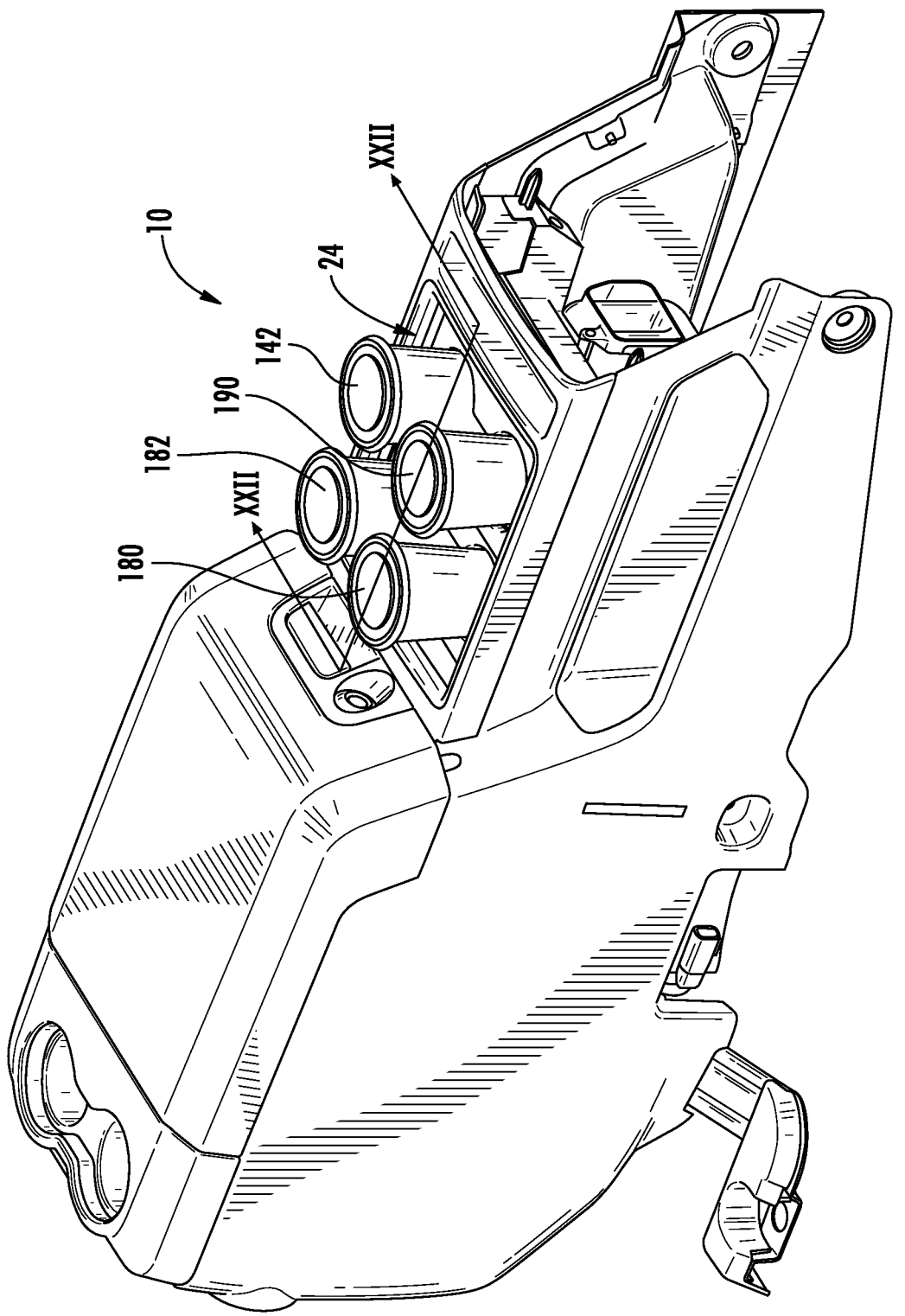
FIG. 21 is a perspective view of the console assembly of FIG. 20 having four beverage containers disposed in the container holder assembly.

Referring now to FIG. 20, the multiple container holder assembly 24 is shown having the upper panel 152 disposed in a second position 2P, wherein the upper panel 152 has been moved from the first portion 20 of the bin 18 to the second portion 22, such that the upper panel 152 is now disposed over the storage compartment 154. In this way, the container holder 24 is a convertible container holder assembly adapted to support and retain multiple containers as best shown in FIG. 21. The upper panel 152 is moved to the second position 2P in a direction as indicated by arrow L, such that the upper panel 152 moves laterally away from the base portion 150 when moving to the second position 2P. As noted above, with specific reference to FIG. 17A, the upper panel 152 includes engagement members 155 disposed on the side walls thereof. As the upper panel 152 moves along the tracks 60, 61 disposed on the bin 18, the engagement members 155 are adapted to engage the front and rear detents 66, 67 disposed on the track members 60, 61 as best shown in FIG. 5C. Thus, the protruding engagement members 155 of the upper panel 152 act in a similar fashion to the engagement members 80, 82 of the tray assembly 26 described above, such that the upper panel 152 is configured to engage the detent tracks 69 and front and rear detent pockets 66, 67 of the track members 60, 61 as the upper panel 152 slides between the first position 1P and the second position 2P. In this way, the upper panel 152 is retained in either the first position 1P or the second position 2P once moved thereto. Further, the detent ramps 68, shown in FIG. 5C, are adapted to generate interference to the engagement members 155 thereby creating tactile feedback to the user in the form of a "click" effect as a user moves the upper panel 152 between the first and second positions. Thus, the user feels the upper panel 152 engage with either the front or rear detent pockets 66, 67 and then knows that the upper panel 152 is retained in the first or second position. One of ordinary skill in the art will appreciate the configuration of the engagement members 155 being functionally identical to the engagement tabs 80, 82 described above with reference to FIGS. 7B-7D.

Referring now to FIGS. 21 and 22, the convertible container holder assembly 24 is supporting and retaining multiple containers 180, 182, 190, 192 which, in this embodiment, are in the form of beverage containers. Thus, as best shown in FIG. 22, container 180 is disposed in container well 170 of the base portion 150. The upper panel 152 is in the second position 2P, wherein the panel 152 is disposed over the storage compartment 154 of the bin 18. Thus, the upper panel 152 is disposed in the bin 18 at an upper position relative to the base portion 150, such that the upper panel 152 can slide between the first position 1P and the second position 2P in the direction indicated by arrow L above the base portion 150, such that the base portion 150 does not interfere with the travel of the upper panel 152. As further shown in FIG. 22, container 190 is supported by the bottom surface 41 of the bin 18 and retained by the retaining aperture 160 of the upper panel 152. Similarly, container 180 is supported by the bottom surface 41A of the bin 18 and further being retained by the container well 170 of the base portion 150. Thus, the retaining apertures 160, 162 of the panel 152, are each adapted to support and retain a container as disposed therein. Further, the container wells 170, 172 of the base portion 150 are also able to individually support and retain a container as disposed therein. In this way, the convertible container holder assembly 24 is able to hold multiple containers by moving the panel 152 to the second position 2P, thereby making the container wells 170, 172 and the retaining apertures 160, 162 individually accessible for storing a container assembly.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A console assembly, comprising:
a tray assembly;
at least one storage compartment including first and second side walls, each side wall having a detent track on which the tray assembly is slidably supported between fore and aft positions; and
front and rear detent pockets disposed at opposite ends of each detent track, the front and rear detent pockets adapted to pivotally support the tray assembly between forward and rearward tilt positions.

2. The console assembly of claim 1, including:
a first set of engagement tabs and a second set of engagement tabs disposed on the tray assembly and adapted to be slidably received in the detent tracks of the first and second side walls of the at least one storage compartment; and
wherein the first set of engagement tabs are disposed in a car-forward position on the tray assembly relative to the second set of engagement tabs.

3. The console assembly of claim 2, wherein:
each engagement tab includes a resilient finger portion having a protruding engagement member disposed thereon.

4. The console assembly of claim 3, wherein:
the engagement members of the first set of engagement tabs are adapted to pivotally engage the front detent pockets when the tray assembly is in the fore position, and further wherein the engagement members of the second set of engagement tabs are adapted to pivotally engage the rear detent pockets when the tray assembly is in the aft position.

5. The console assembly of claim 4, wherein:
the engagement members of the first set of engagement tabs are adapted to pivotally engage the front detent pockets when the tray assembly is in the forward tilt position, and further wherein the engagement members of the second set of engagement tabs are disengaged from the detent tracks in the forward tilt position.

6. The console assembly of claim 4, wherein:
the engagement members of the second set of engagement tabs are adapted to pivotally engage the rear detent pockets when the tray assembly is in the rearward tilt position, and further wherein the engagement members of the first set of engagement tabs are disengaged from the detent tracks in the rearward tilt position.

7. The console assembly of claim 4, including:
ramp members disposed adjacent to the front and rear detent pockets, wherein the ramp members are configured to engage the protruding engagement members and deform the resilient finger portion of the engagement tabs from an at rest position as the tray assembly slides over the ramp members towards one of the fore and aft positions; and
further wherein the resilient finger portions are adapted to return to the at rest position when the tray assembly is positioned in one of the fore and aft positions.

8. The console assembly of claim 4, including:
a second storage compartment including first and second side walls, each side wall having a detent track in which the tray assembly is adapted to be slidably supported between fore and aft positions along the second storage compartment; and
front and rear detent pockets disposed at opposite ends of each detent track, the front and rear detent pockets adapted to pivotally support the tray assembly between forward and rearward tilt positions in the second storage compartment.

* * * * *